United States Patent
Chandra et al.

(10) Patent No.: US 12,472,954 B2
(45) Date of Patent: Nov. 18, 2025

(54) AUTOMATED BUMP AND/OR DEPRESSION DETECTION IN A ROADWAY

(71) Applicant: Aurora Operations, Inc., Pittsburgh, PA (US)

(72) Inventors: Shivali Chandra, Pittsburgh, PA (US); Sean David Vig, Pittsburgh, PA (US)

(73) Assignee: Aurora Operations, Inc., Pittsburgh, PA (US)

( * ) Notice: Subject to any disclaimer, the term of this patent is extended or adjusted under 35 U.S.C. 154(b) by 205 days.

(21) Appl. No.: 17/805,362

(22) Filed: Jun. 3, 2022

(65) Prior Publication Data

US 2022/0363263 A1 Nov. 17, 2022

Related U.S. Application Data

(63) Continuation of application No. 16/727,695, filed on Dec. 26, 2019, now abandoned.

(60) Provisional application No. 62/784,993, filed on Dec. 26, 2018.

(51) Int. Cl.
*G05D 1/00* (2024.01)
*B60W 40/06* (2012.01)
*G01S 17/89* (2020.01)

(52) U.S. Cl.
CPC ............ *B60W 40/06* (2013.01); *G01S 17/89* (2013.01); *G05D 1/0248* (2013.01); *B60W 2552/35* (2020.02)

(58) Field of Classification Search
CPC .................................................... B60W 40/06
See application file for complete search history.

(56) References Cited

U.S. PATENT DOCUMENTS

| | | | |
|---|---|---|---|
| 10,049,584 B2 * | 8/2018 | Deittert | G08G 5/0034 |
| 2011/0112764 A1 * | 5/2011 | Trum | G08G 1/096827 |
| | | | 701/469 |
| 2014/0160295 A1 * | 6/2014 | Kyomitsu | G08G 1/0112 |
| | | | 340/905 |
| 2014/0195112 A1 * | 7/2014 | Lu | B60G 17/015 |
| | | | 703/2 |
| 2014/0227031 A1 | 8/2014 | Fifi et al. | |
| 2014/0303806 A1 | 10/2014 | Bai et al. | |
| 2014/0336842 A1 * | 11/2014 | Jang | G06V 20/58 |
| | | | 701/1 |

(Continued)

OTHER PUBLICATIONS

"U.S. Appl. No. 16/727,695, Non Final Office Action mailed Feb. 3, 2022", 61 pgs.

*Primary Examiner* — Vivek D Koppikar
*Assistant Examiner* — Paul W Arellano
(74) *Attorney, Agent, or Firm* — Schwegman Lundberg & Woessner, P.A.

(57) ABSTRACT

Systems, devices, products, apparatuses, and/or methods for identifying a speed bump for an autonomous vehicle on a roadway by determining at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters, and identifying at least one bump or depression in the roadway based on the at least one beginning location and the at least one ending location.

16 Claims, 8 Drawing Sheets

(56) References Cited

U.S. PATENT DOCUMENTS

2017/0336794 A1* 11/2017 Shashua ........... G08G 1/096725
2018/0334166 A1* 11/2018 Zhu ....................... B60W 30/12
2020/0207356 A1    7/2020 Chandra et al.

* cited by examiner

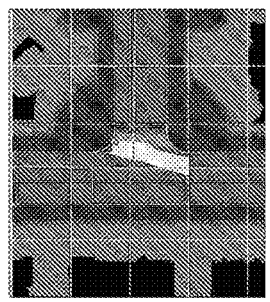
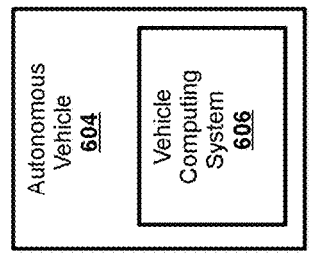
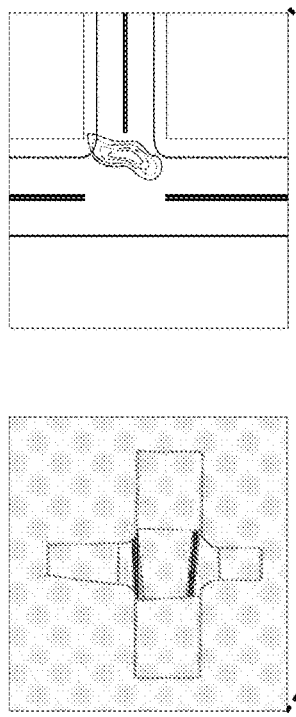
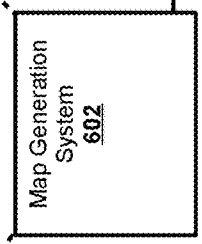
FIG. 6C

AUTOMATED BUMP AND/OR DEPRESSION DETECTION IN A ROADWAY

This application is a continuation of and claims the benefit of priority of U.S. application Ser. No. 16/727,695, filed Dec. 26, 2019, which claims the benefit of U.S. Provisional Application No. 62/784,993, filed Dec. 26, 2018, the entire disclosure of each of which is hereby incorporated by reference in their entireties.

BACKGROUND

An autonomous vehicle (e.g., a driverless car, a driverless automobile, a self-driving car, a robotic car, etc.) is a vehicle that is capable of sensing an environment of the vehicle and traveling (e.g., navigating, moving, etc.) in the environment without human participation. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant bumps and/or depressions associated with a route.

SUMMARY

Accordingly, disclosed are systems, devices, products, apparatuses, and/or methods for automated bump and/or depression detection in a roadway.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

Provided are systems, devices, products, apparatuses, and/or methods for improving prediction of bumps or depressions on a roadway of an autonomous vehicle, improving generation of an autonomous vehicle map to include locations of bumps or depressions for an autonomous vehicle, improving control of travel in a driving path of an autonomous vehicle based on predictions of bumps or depressions, and/or the like. According to some non-limiting embodiments or aspects, provided is a computer-implemented method comprising: obtaining, with a computing system comprising one or more processors, sensor data associated with one or more traversals of a roadway in a geographic location by one or more vehicles, wherein the sensor data includes one or more parameters associated with a plurality of locations in the roadway; determining, with the computing system, for each subset of a plurality of subsets of the plurality of locations, a change in the one or more parameters over that subset of locations; determining, with the computing system, one or more subsets of the plurality of subsets having a greater change in the one or more parameters than one or more other subsets of the plurality of subsets; determining, with the computing system, at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identifying, with the computing system, at least one bump or depression in the roadway based on the at least one beginning location and the at least one ending location.

In some non-limiting embodiments or aspects, identifying the at least one bump or depression in the roadway further comprises: determining, with the computing system, at least one highest or lowest location between the at least one beginning location and the at least one ending location in the one or more subsets of the plurality of subsets based on at least one parameter associated with locations in a line between the at least one beginning location and the at least one ending location in the roadway; determining, with the computing system, a centerline from a plurality of lines projecting at a plurality of angles through the at least one highest or lowest location, wherein the centerline corresponds to a line of the plurality of lines having a minimum change between the at least one highest or lowest location and other locations in the line; and generating, with the computing system, a beginning line projecting through the at least one beginning location in the one or more subsets parallel to the centerline and an ending line projecting through the at least one ending location in the one or more subsets parallel to the centerline.

In some non-limiting embodiments or aspects, the plurality of locations correspond to a plurality of map areas of a map of the geographic location, and wherein the subset of the plurality of locations are associated with a predetermined distance comprising a car length distance, a half-car length distance, and/or the like.

In some non-limiting embodiments or aspects, the one or more subsets of the plurality of subsets of the plurality of locations includes two or more subsets, and wherein at least a portion of the locations in a first subset of the two or more subsets overlaps with at least a portion of the locations in a second subset in the two or more subsets, the method further comprising: generating a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes the probability that the location of the overlapping portions includes the at least one bump or depression in the roadway.

In some non-limiting embodiments or aspects, the method further comprises generating, with the computing system, a region in the probability map of the geographic location, corresponding to the probability that the map area associated with the region is a location of the at least one bump or depression.

In some non-limiting embodiments or aspects, the method further comprises providing, with the computing system, the map including the region having a selectable factor in the map for indicating the location of the bump or depression in the map of the geographic location.

In some non-limiting embodiments or aspects, the method further comprises generating, with the computing system, a right edge connecting the beginning line and the ending line based on at least one of a first edge of the roadway and a first edge of an intersection of the roadway; and generating, with the computing system, a left edge connecting the beginning line and the ending line based on at least one of a second edge of the roadway and a second edge of the intersection of the roadway.

In some non-limiting embodiments or aspects, the method further comprises generating, with the computing system, a right edge connecting the beginning line and the ending line based on the at least one parameter of locations between the beginning line and the ending line; and generating, with the computing system, a left edge connecting the beginning line and the ending line based on the at least one parameter of locations between the beginning line and the ending line.

In some non-limiting embodiments or aspects, the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

According to some non-limiting embodiments or aspects, provided is a computing system comprising one or more processors programmed and/or configured to: obtain sensor data associated with one or more traversals of a roadway in a geographic location by one or more vehicles, wherein the sensor data includes one or more parameters associated with a plurality of locations in the roadway; determine for each subset of a plurality of subsets of the plurality of locations, a change in the one or more parameters over that subset of locations; determine one or more subsets of the plurality of subsets having a greater change in the one or more parameters than one or more other subsets of the plurality of subsets; determine at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identify at least one bump or depression in the roadway based on the at least one beginning location and the at least one ending location.

In some non-limiting embodiments or aspects, the one or more processors are further programmed and/or configured to identify the at least one bump or depression in the roadway by determining at least one highest or lowest location between the at least one beginning location and the at least one ending location in the one or more subsets of the plurality of subsets based on at least one parameter associated with locations in a line between the at least one beginning location and the at least one ending location in the roadway; determining a centerline from a plurality of lines projecting at a plurality of angles through the at least one highest or lowest location, wherein the centerline corresponds to a line of the plurality of lines having a minimum change in the at least one highest or lowest location and other locations in the line; and generating a beginning line projecting through the at least one beginning location in the one or more subsets parallel to the centerline and an ending line projecting through the at least one ending location in the one or more subsets parallel to the centerline.

In some non-limiting embodiments or aspects, the plurality of locations correspond to a plurality of map areas of a map of the geographic location, and wherein the subset of the plurality of locations are associated with a predetermined distance comprising a car length distance, a half-car length distance, and/or the like.

In some non-limiting embodiments or aspects, the one or more subsets of the plurality of subsets of the plurality of locations includes two or more subsets, and wherein at least a portion of the locations in a first subset of the two or more subsets overlaps with at least a portion of the locations in a second subset in the two or more subsets, and wherein the one or more processors are further programmed and/or configured to: generate a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes a probability that the location of the overlapping portions includes the at least one bump or depression in the roadway.

In some non-limiting embodiments or aspects, the one or more processors are further programmed and/or configured to generate a region in the probability map of the geographic location, corresponding to a probability that the map area associated with the region is a location of the at least one bump or depression.

In some non-limiting embodiments or aspects, the one or more processors are further programmed and/or configured to provide the map including the region having a selectable factor in the map for indicating the location of the at least one bump or depression in the map of the geographic location.

In some non-limiting embodiments or aspects, the one or more processors are further programmed and/or configured to generate a right edge connecting the beginning line and the ending line based on at least one of a first edge of the roadway and a first edge of an intersection of the roadway; and generate a left edge connecting the beginning line and the ending line based on at least one of a second edge of the roadway and a second edge of the intersection of the roadway.

In some non-limiting embodiments or aspects, the one or more processors are further programmed and/or configured to generate a right edge connecting the beginning line and the ending line based on the at least one parameter of locations between the beginning line and the ending line; and generate a left edge connecting the beginning line and the ending line based on the at least one parameter of locations between the beginning line and the ending line.

In some non-limiting embodiments or aspects, the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

According to some non-limiting embodiments or aspects, provided is a computer program product comprising at least one non-transitory computer-readable medium including program instructions that, when executed by at least one processor, cause the at least one processor to: obtain sensor data associated with one or more traversals of a roadway in a geographic location by one or more vehicles, wherein the sensor data includes one or more parameters associated with a plurality of locations in the roadway, and wherein the plurality of locations are associated with a predetermined distance comprising a car length distance or a half-car length distance; determine for each subset of a plurality of subsets of the plurality of locations, a change in the one or more parameters over that subset of locations; determine one or more subsets of the plurality of subsets having a greater change in the one or more parameters than one or more other subsets of the plurality of subsets; determine at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identify at least one bump or depression in the roadway based on the at least one beginning location and the at least one ending location.

In some non-limiting embodiments or aspects, the at least one non-transitory computer-readable medium includes further programming instructions, that when executed by the at least one processor, cause the at least one processor to determine at least one highest or lowest location between the at least one beginning location and the at least one ending location in the one or more subsets of the plurality of subsets based on at least one parameter associated with locations in a line between the at least one beginning location and the at least one ending location in the roadway; determine a centerline from a plurality of lines projecting at a plurality of angles through the at least one highest or lowest location, wherein the centerline corresponds to a line of the plurality of lines having a minimum change between the at least one highest or lowest location and other locations in the line; and generate a beginning line projecting through the at least one beginning location in the one or more subsets parallel to the centerline and an ending line projecting through the at least one ending location in the one or more subsets parallel to the centerline.

In some non-limiting embodiments or aspects, the plurality of locations correspond to a plurality of map areas of a map of the geographic location, and wherein the subset of the plurality of locations are associated with a predetermined distance comprising a car length distance, a half-car length distance, and/or the like.

In some non-limiting embodiments or aspects, the one or more subsets of the plurality of subsets of the plurality of locations includes two or more subsets, and wherein at least a portion of the locations in a first subset of the two or more subsets overlaps with at least a portion of the locations in a second subset in the two or more subsets, and the at least one non-transitory computer-readable medium includes further programming instructions, that when executed by the at least one processor, cause the at least one processor to generate a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes a probability that the location of the overlapping portions includes the at least one bump or depression in the roadway.

In some non-limiting embodiments or aspects, the at least one non-transitory computer-readable medium includes further programming instructions, that when executed by the at least one processor, cause the at least one processor to generate a region in the probability map of the geographic location, corresponding to a probability that the map area associated with the region is a location of the at least one bump or depression.

In some non-limiting embodiments or aspects, the at least one non-transitory computer-readable medium includes further programming instructions, that when executed by the at least one processor, cause the at least one processor to provide the map including the region having a selectable factor in the map for indicating the location of the at least one bump or depression in the map of the geographic location.

In some non-limiting embodiments or aspects, the at least one non-transitory computer-readable medium includes further programming instructions, that when executed by the at least one processor, cause the at least one processor to generate a right edge connecting the beginning line and the ending line based on at least one of a first edge of the roadway and a first edge of an intersection of the roadway; and generate a left edge connecting the beginning line and the ending line based on at least one of a second edge of the roadway and a second edge of the intersection of the roadway.

In some non-limiting embodiments or aspects, the at least one non-transitory computer-readable medium includes further programming instructions, that when executed by the at least one processor, cause the at least one processor to generate a right edge connecting the beginning line and the ending line based on the at least one parameter of locations between the beginning line and the ending line; and generate a left edge connecting the beginning line and the ending line based on the at least one parameter of locations between the beginning line and the ending line.

In some non-limiting embodiments or aspects, the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

According to some non-limiting embodiments or aspects, provided is an autonomous vehicle comprising: one or more processors programmed and/or configured to: obtain sensor data associated with one or more traversals of a roadway in a geographic location by one or more vehicles, wherein the sensor data includes one or more parameters associated with a plurality of locations in the roadway; determine for each subset of a plurality of subsets of the plurality of locations, a change in the one or more parameters over that subset of locations; determine one or more subsets of the plurality of subsets having a greater change in the one or more parameters than one or more other subsets of the plurality of subsets; determine at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identify at least one bump or depression in the roadway based on the at least one beginning location and the at least one ending location.

In some non-limiting embodiments or aspects, the one or more processors are further programmed and/or configured to identify the at least one bump or depression in the roadway by determining at least one highest or lowest location between the at least one beginning location and the at least one ending location in the one or more subsets of the plurality of subsets based on at least one parameter associated with locations in a line between the at least one beginning location and the at least one ending location in the roadway; determining a centerline from a plurality of lines projecting at a plurality of angles through the at least one highest or lowest location, wherein the centerline corresponds to a line of the plurality of lines having a minimum change in the at least one highest or lowest location and other locations in the line; and generating a beginning line projecting through the at least one beginning location in the one or more subsets parallel to the centerline and an ending line projecting through the at least one ending location in the one or more subsets parallel to the centerline.

In some non-limiting embodiments or aspects, the plurality of locations correspond to a plurality of map areas of a map of the geographic location, and wherein the subset of the plurality of locations are associated with a predetermined distance comprising a car length distance, a half-car length distance, and/or the like.

In some non-limiting embodiments or aspects, the one or more subsets of the plurality of subsets of the plurality of locations includes two or more subsets, and wherein at least a portion of the locations in a first subset of the two or more subsets overlaps with at least a portion of the locations in a second subset in the two or more subsets, and wherein the one or more processors are further programmed and/or configured to: generate a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes a probability that the location of the overlapping portions includes the at least one bump or depression in the roadway.

In some non-limiting embodiments or aspects, the one or more processors are further programmed and/or configured to generate a region in the probability map of the geographic location, corresponding to a probability that the map area associated with the region is a location of the at least one bump or depression.

In some non-limiting embodiments or aspects, the one or more processors are further programmed and/or configured to provide the map including the region having a selectable factor in the map for indicating the location of the at least one bump or depression in the map of the geographic location.

In some non-limiting embodiments or aspects, the one or more processors are further programmed and/or configured to generate a right edge connecting the beginning line and the ending line based on at least one of a first edge of the roadway and a first edge of an intersection of the roadway; and generate a left edge connecting the beginning line and the ending line based on at least one of a second edge of the roadway and a second edge of the intersection of the roadway.

In some non-limiting embodiments or aspects, the one or more processors are further programmed and/or configured to generate a right edge connecting the beginning line and the ending line based on the at least one parameter of locations between the beginning line and the ending line; and generate a left edge connecting the beginning line and the ending line based on the at least one parameter of locations between the beginning line and the ending line.

In some non-limiting embodiments or aspects, the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

Further non-limiting embodiments or aspects are set forth in the following numbered clauses:

Clause 1: A method comprising: obtaining, with a computing system comprising one or more processors, sensor data associated with one or more traversals of a roadway in a geographic location by one or more vehicles, wherein the sensor data includes one or more parameters associated with a plurality of locations in the roadway; determining, with the computing system, for each subset of a plurality of subsets of the plurality of locations, a change in the one or more parameters over that subset of locations; determining, with the computing system, one or more subsets of the plurality of subsets having a greater change in the one or more parameters than one or more other subsets of the plurality of subsets; determining, with the computing system, at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identifying, with the computing system, at least one bump or depression in the roadway based on the at least one beginning location and the at least one ending location.

Clause 2: The method of clause 1, wherein identifying the at least one bump or depression in the roadway further comprises: determining, with the computing system, at least one highest or lowest location between the at least one beginning location and the at least one ending location in the one or more subsets of the plurality of subsets based on at least one parameter associated with locations in a line between the at least one beginning location and the at least one ending location in the roadway; determining, with the computing system, a centerline from a plurality of lines projecting at a plurality of angles through the at least one highest or lowest location, wherein the centerline corresponds to a line of the plurality of lines having a minimum change between the at least one highest or lowest location and other locations in the line; and generating, with the computing system, a beginning line projecting through the at least one beginning location in the one or more subsets parallel to the centerline and an ending line projecting through the at least one ending location in the one or more subsets parallel to the centerline.

Clause 3: The method of any of clauses 1 or 2, wherein the plurality of locations correspond to a plurality of map areas of a map of the geographic location, and wherein the subset of the plurality of locations are associated with a predetermined distance comprising a car length distance, a half-car length distance, and/or the like.

Clause 4: The method of any of clauses 1-3, wherein the one or more subsets of the plurality of subsets of the plurality of locations includes two or more subsets, and wherein at least a portion of the locations in a first subset of the two or more subsets overlaps with at least a portion of the locations in a second subset in the two or more subsets, the method further comprising: generating a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes the probability that the location of the overlapping portions includes the at least one bump or depression in the roadway.

Clause 5: The method of any of clauses 1-4, the method further comprising: generating, with the computing system, a region in the probability map of the geographic location, corresponding to the probability that the map area associated with the region is a location of the at least one bump or depression.

Clause 6: The method of any of clauses 1-5, further comprising: providing, with the computing system, the map including the region having a selectable factor in the map for indicating the location of the bump or depression in the map of the geographic location.

Clause 7: The method of any of clauses 1-6, further comprising: generating, with the computing system, a right edge connecting the beginning line and the ending line based on at least one of a first edge of the roadway and a first edge of an intersection of the roadway; and generating, with the computing system, a left edge connecting the beginning line and the ending line based on at least one of a second edge of the roadway and a second edge of the intersection of the roadway.

Clause 8: The method of any of clauses 1-7, comprising: generating, with the computing system, a right edge connecting the beginning line and the ending line based on the at least one parameter of locations between the beginning line and the ending line; and generating, with the computing system, a left edge connecting the beginning line and the ending line based on the at least one parameter of locations between the beginning line and the ending line.

Clause 9: The method of any of clauses 1-8, wherein the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

Clause 10: A computing system comprising: one or more processors programmed and/or configured to: obtain sensor data associated with one or more traversals of a roadway in a geographic location by one or more vehicles, wherein the sensor data includes one or more parameters associated with a plurality of locations in the roadway; determine for each subset of a plurality of subsets of the plurality of locations, a change in the one or more parameters over that subset of locations; determine one or more subsets of the plurality of subsets having a greater change in the one or more parameters than one or more other subsets of the plurality of subsets; determine at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identify at least one bump or depression in the roadway based on the at least one beginning location and the at least one ending location.

Clause 11: The computing system of clause 10, wherein the one or more processors are further programmed and/or configured to identify the at least one bump or depression in the roadway by: determining at least one highest or lowest location between the at least one beginning location and the at least one ending location in the one or more subsets of the plurality of subsets based on at least one parameter associated with locations in a line between the at least one beginning location and the at least one ending location in the roadway; determining a centerline from a plurality of lines projecting at a plurality of angles through the at least one highest or lowest location, wherein the centerline corresponds to a line of the plurality of lines having a minimum change in the at least one highest or lowest location and other locations in the line; and generating a beginning line projecting through the at least one beginning location in the one or more subsets parallel to the centerline and an ending line projecting through the at least one ending location in the one or more subsets parallel to the centerline.

Clause 12: The method of any of clauses 10 or 11, wherein the plurality of locations correspond to a plurality of map areas of a map of the geographic location, and wherein the subset of the plurality of locations are associated with a predetermined distance comprising a car length distance, a half-car length distance, and/or the like.

Clause 13: The method of any of clauses 10-12, wherein the one or more subsets of the plurality of subsets of the plurality of locations includes two or more subsets, and wherein at least a portion of the locations in a first subset of the two or more subsets overlaps with at least a portion of the locations in a second subset in the two or more subsets, and wherein the one or more processors are further programmed and/or configured to: generate a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes a probability that the location of the overlapping portions includes the at least one bump or depression in the roadway.

Clause 14: The method of any of clauses 10-13, wherein the one or more processors are further programmed and/or configured to: generate a region in the probability map of the geographic location, corresponding to a probability that the map area associated with the region is a location of the at least one bump or depression.

Clause 15: The method of any of clauses 10-14, wherein the one or more processors are further programmed and/or configured to: provide the map including the region having a selectable factor in the map for indicating the location of the at least one bump or depression in the map of the geographic location.

Clause 16: The method of any of clauses 10-15, wherein the one or more processors are further programmed and/or configured to: generate a right edge connecting the beginning line and the ending line based on at least one of a first edge of the roadway and a first edge of an intersection of the roadway; and generate a left edge connecting the beginning line and the ending line based on at least one of a second edge of the roadway and a second edge of the intersection of the roadway.

Clause 17: The method of any of clauses 10-16, wherein the one or more processors are further programmed and/or configured to: generate a right edge connecting the beginning line and the ending line based on the at least one parameter of locations between the beginning line and the ending line; and generate a left edge connecting the beginning line and the ending line based on the at least one parameter of locations between the beginning line and the ending line.

Clause 18: The method of any of clauses 10-17, wherein the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

Clause 19: A computer program product comprising at least one non-transitory computer-readable medium including program instructions that, when executed by at least one processor, cause the at least one processor to: obtain sensor data associated with one or more traversals of a roadway in a geographic location by one or more vehicles, wherein the sensor data includes one or more parameters associated with a plurality of locations in the roadway, and wherein the plurality of locations are associated with a predetermined distance comprising a car length distance or a half-car length distance; determine for each subset of a plurality of subsets of the plurality of locations, a change in the one or more parameters over that subset of locations; determine one or more subsets of the plurality of subsets having a greater change in the one or more parameters than one or more other subsets of the plurality of subsets; determine at least one beginning location in the one or more subsets of the plurality of subsets associated with a greatest positive change or a greatest negative change in the one or more parameters and at least one ending location in the one or more subsets of the plurality of subsets associated with the other of the greatest positive change or the greatest negative change in the one or more parameters; and identify at least one bump or depression in the roadway based on the at least one beginning location and the at least one ending location.

Clause 20: The computer program product of clause 19, wherein the at least one non-transitory computer-readable medium includes further programming instructions, that when executed by the at least one processor, cause the at least one processor to: determine at least one highest or lowest location between the at least one beginning location and the at least one ending location in the one or more subsets of the plurality of subsets based on at least one parameter associated with locations in a line between the at least one beginning location and the at least one ending location in the roadway; determine a centerline from a plurality of lines projecting at a plurality of angles through the at least one highest or lowest location, wherein the centerline corresponds to a line of the plurality of lines having a minimum change between the at least one highest or lowest location and other locations in the line; and generate a beginning line projecting through the at least one beginning location in the one or more subsets parallel to the centerline and an ending line projecting through the at least one ending location in the one or more subsets parallel to the centerline.

Clause 21: The computer program product of clauses 19 or 20, wherein the one or more processors are further programmed and/or configured to identify the at least one bump or depression in the roadway by: determining at least one highest or lowest location between the at least one beginning location and the at least one ending location in the one or more subsets of the plurality of subsets based on at least one parameter associated with locations in a line between the at least one beginning location and the at least one ending location in the roadway; determining a centerline from a plurality of lines projecting at a plurality of angles through the at least one highest or lowest location, wherein the centerline corresponds to a line of the plurality of lines having a minimum change in the at least one highest or lowest location and other locations in the line; and generating a beginning line projecting through the at least one beginning location in the one or more subsets parallel to the centerline and an ending line projecting through the at least one ending location in the one or more subsets parallel to the centerline.

Clause 22: The computer program product of any of clauses 19-21, wherein the plurality of locations correspond to a plurality of map areas of a map of the geographic location, and wherein the subset of the plurality of locations are associated with a predetermined distance comprising a car length distance, a half-car length distance, and/or the like.

Clause 23: The computer program product of any of clauses 19-22, wherein the one or more subsets of the plurality of subsets of the plurality of locations includes two or more subsets, and wherein at least a portion of the locations in a first subset of the two or more subsets overlaps with at least a portion of the locations in a second subset in the two or more subsets, and wherein the one or more processors are further programmed and/or configured to: generate a probability map associated with a probability of the at least one bump or depression in at least one map area of the plurality of map areas, based on at least the portion of the locations in the first subset of the two or more subsets overlapping with at least the portion of the locations in the second subset of the two or more subsets, wherein the probability map comprises at least one map layer in a plurality of map layers of the map, and wherein the probability map includes a probability that the location of the overlapping portions includes the at least one bump or depression in the roadway.

Clause 24: The computer program product of any of clauses 19-23, wherein the one or more processors are further programmed and/or configured to: generate a region in the probability map of the geographic location, corresponding to a probability that the map area associated with the region is a location of the at least one bump or depression.

Clause 25: The computer program product of any of clauses 19-24, wherein the one or more processors are further programmed and/or configured to: provide the map including the region having a selectable factor in the map for indicating the location of the at least one bump or depression in the map of the geographic location.

Clause 26: The computer program product of any of clauses 19-25, wherein the one or more processors are further programmed and/or configured to: generate a right edge connecting the beginning line and the ending line based on at least one of a first edge of the roadway and a first edge of an intersection of the roadway; and generate a left edge connecting the beginning line and the ending line based on at least one of a second edge of the roadway and a second edge of the intersection of the roadway.

Clause 27: The computer program product of any of clauses 19-26, wherein the one or more processors are further programmed and/or configured to: generate a right edge connecting the beginning line and the ending line based on the at least one parameter of locations between the beginning line and the ending line; and generate a left edge connecting the beginning line and the ending line based on the at least one parameter of locations between the beginning line and the ending line.

Clause 28: The computer program product of any of clauses 19-27, wherein the one or more parameters comprise at least one of the following parameters: z-value, pitch, pitch rate, longitudinal speed, longitudinal acceleration, yaw, yaw rate, latitudinal speed, latitudinal acceleration, x-values, y-values, roll, or roll rate.

BRIEF DESCRIPTION OF THE DRAWINGS

FIGS. 6A-6C are diagrams of an implementation of one or more processes disclosed herein.

DETAILED DESCRIPTION

Figure 1:
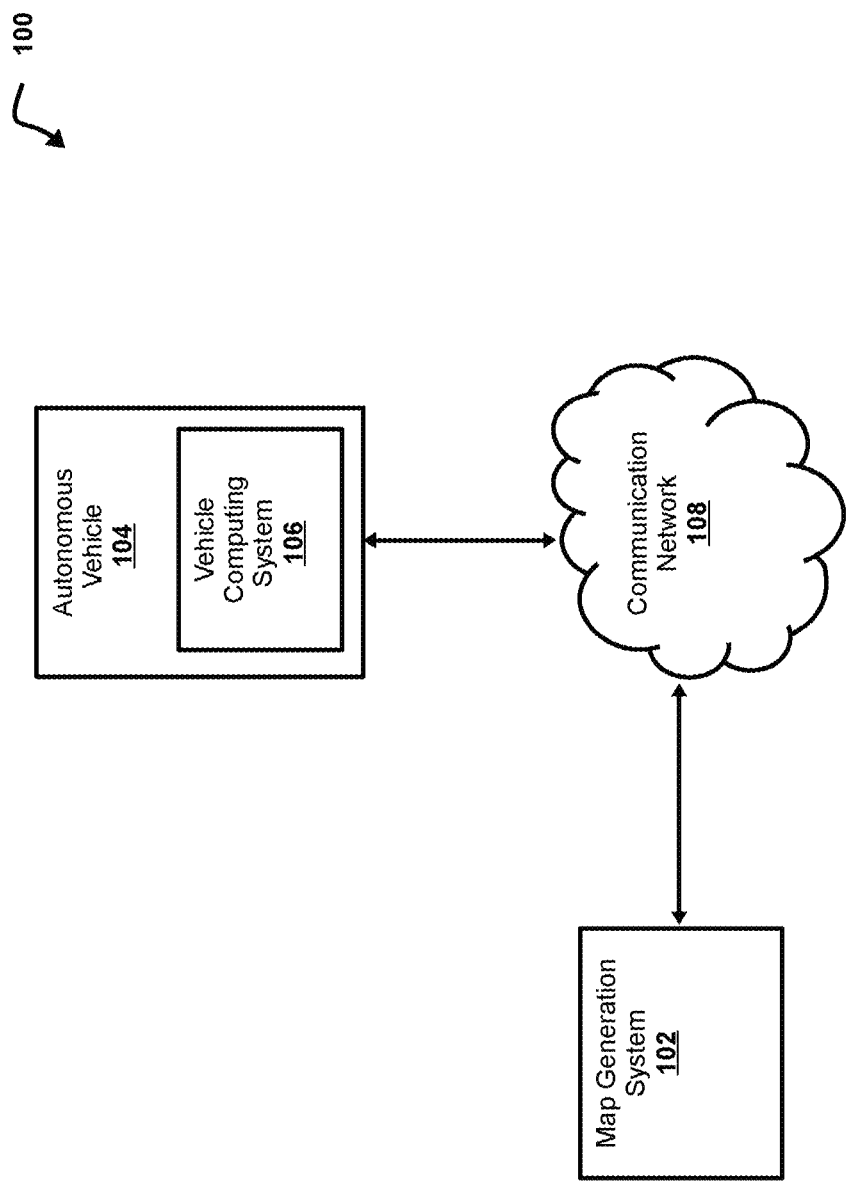
FIG. 1 is a diagram of a non-limiting embodiment or aspect of an environment in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a non-transitory computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

It will be apparent that the systems and/or methods described herein can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

An autonomous vehicle (AV) map includes information associated with a roadway, such as an orientation and/or location of a bump (e.g., a speed bump, speed hump, etc.) and/or a depression (e.g., a ditch, a drainage ditch, a pothole, etc.) relative to the roadway. An AV may traverse a roadway, including one or more bumps or depressions, based on an AV map including one or more bumps or depressions in a geographic location including the roadway. For safety and efficiency, an AV map includes precise identifying information and/or labels for indicating a bump or depression (e.g., marking of a bump boundary, positioning of a bump, labeling of location parameters of a bump, providing orientation of a bump with respect to a road or intersection, etc.). Such precision, for example, enables the AV (e.g., a vehicle computing system of the AV, etc.) to use the AV map for determining vehicle maneuvers based on objects in the AV map (e.g., speed bumps, speed humps, depressions, ditches, etc.) that have been detected in the geographic location of the roadway over which the AV travels.

In existing systems, objects in an AV map are produced manually by a human operator identifying, drawing, and/or labeling bumps and/or depressions in a map of the geographic location. For example, in a manually produced AV map, bumps or depressions (e.g., speed bumps, drainage ditches, etc.) are hand-drawn and manually established by using map data that has been provided by the AV map. Bumps are identified manually (e.g., manually searching the map data, etc.) by using elevation parameters to observe changes throughout a map that are associated with a bump or a depression.

However, such elevation parameters in the map data may be incomplete, inaccurate, and/or insufficient to determine the location of a bump and/or a depression. Also, bumps and/or depressions can be difficult to locate manually and/or use a time intensive process requiring specialists (e.g., a specialist involved in the production of a map, etc.) to find and draw (e.g., label, annotate, position, orient, etc.) bumps and/or depressions in a map. For example, specialists may examine an area of a map searching for indications (e.g., elevations, speed limits, etc.) in the map data associated with the area that may potentially represent a bump and/or a depression, which presents a difficulty associated with parsing through many values and/or visually obscure representations of the area. After finding potential areas, manually identifying a bump is also time consuming as a specialist must judge if an area of the map includes characteristics that are both representative and sufficient to encode the bump into the map by looking at maps and map images and viewing parameters and parameter changes in the AV map (e.g., changes in the elevation, etc.). For example, determining z-values is processing-intensive (e.g., querying individual z-values from a map, etc.).

One of the aspects that makes AV maps particularly difficult to create (e.g., to draw, to generate, etc.) is the extent to which the AV map must accurately represent the position of an object (e.g., a bump, depression, etc.) in the map. An AV may not know (e.g., may not obtain information to determine, etc.) when and where a bump exists relative to a roadway in a geographic location when an AV map includes manual designations of bumps that inaccurately represent the bump and/or may not determine with sufficient speed, accuracy, and/or precision (e.g., within a threshold distance, etc.) whether a bump may cause or create a safety issue unless the bump is accurately positioned and represented in the AV map with a proper orientation in the road or intersection. In addition, an AV using the AV map may not be able to travel in a roadway through a geographic location having a bump if the AV is not able to determine (e.g., read, etc.) where the bump is located in a roadway, and/or if the position of the bump is based on an incorrect judgment and/or includes an inaccurate representation in the AV map. Further, generating an AV map that includes manual designations of bumps in a geographic location may consume a relatively large amount of network and/or processing resources and a relatively large amount of time, as an AV map that includes manual designations for each bump in a geographic location may not be sufficiently generated based on a lack of network and/or processing resources to generate the AV map, a lack of time to generate the AV map, and/or a lack of data to generate the AV map. Still further, map data may be insufficient or deficient, such that a bump or depression may not be determined, or at least not accurately and/or efficiently determined, and/or identified, and bumps and/or depressions that are identified may not accurately and/or efficiently represent the bump or depression in the AV map. As an example, if a bump is improperly or inaccurately identified in a geographic location, autonomous travel may not be available to properly control an AV (e.g., an AV traveling in the roadway of the geographic location may not accurately predict that a bump exists in the path, an AV may determine a bump exists in the roadway that may not be represented in the AV map, etc.).

Non-limiting embodiments or aspects of the present disclosure are directed to systems, devices, products, apparatuses, and/or methods for automatically identifying bumps and/or depressions based on sensor data associated with one or more traversals of a roadway by one or more vehicles and/or providing bump and/or depression information in an AV map for map production. For example, a method may include obtaining sensor data associated with one or more traversals of a roadway in a geographic location by one or more vehicles, wherein the sensor data includes one or more parameters associated with a plurality of locations in the roadway; determining for each subset of a plurality of subsets of the plurality of locations, a change in the one or more parameters over that subset of locations; determining one or more subsets of the plurality of subsets having a greater change in the one or more parameters than one or more other subsets of the plurality of subsets; determining at least one beginning location (e.g., an entry point of a bump, an entry point of a depression, etc.) in the one or more subsets of the plurality of subsets associated with a greatest positive change or a greatest negative change in the one or more parameters and at least one ending location (e.g., an exit point of a bump, an exit point of a depression, etc.) in the one or more subsets of the plurality of subsets associated with the other of the greatest positive change or the greatest negative change in the one or more parameters; and identifying at least one bump or depression in the roadway based on the at least one beginning location and the at least one ending location. In this way, rather than detecting individual bumps and/or depressions in a map, automatically identified bump and/or depression areas that are detected across a subset of a plurality of locations in a map can be aggregated together with beginning lines and ending lines for identifying a region associated with the bump to effectively enable a more accurate and efficient bump and/or depression identification in a geographic location, to provide tools and or information signals for more efficiently generating and/or verifying a bump and/or a depression in an AV map, and to provide more accurate bump and/or depression information and/or signals by which missing or improperly mapped bumps may be determined, corrected, and/or adjusted in a map. Accordingly, time-intensive mapping of roadways (e.g., mapping of roadways with potentially obscured and/or hard to detect bumps, etc.) may be reduced, navigation range and safety of AV travel may be enhanced, networking and processing time for generating AV maps may be reduced, and a time associated with human editing of an AV map (e.g., to label, to annotate, to position, to orient, etc.) may be reduced Referring now to FIG. 1, FIG. 1 is a diagram of an example environment 100 in which devices, systems, methods, apparatuses, and/or products described herein may be implemented. As shown in FIG. 1, environment 100 includes map generation system 102, autonomous vehicle 104 including vehicle computing system 106, and communication network 108. Systems and/or devices of environment 100 can interconnect via wired connections, wireless connections, or a combination of wired and wireless connections.

In some non-limiting embodiments or aspects, map generation system 102 includes one or more devices capable of obtaining sensor data associated with one or more traversals of a roadway in a geographic location by one or more vehicles, and the sensor data includes one or more parameters associated with a plurality of locations in the roadway, determining for each subset of a plurality of subsets of the plurality of locations, a change in the one or more parameters over that subset of locations; determining one or more subsets of the plurality of subsets having a greater change in the one or more parameters than one or more other subsets of the plurality of subsets, determining at least one beginning location (e.g., an entry point of a bump, an entry point of a depression, etc.) in the one or more subsets of the plurality of subsets associated with a greatest positive change or a greatest negative change in the one or more parameters and at least one ending location (e.g., an exit point of a bump, an exit point of a depression, etc.) in the one or more subsets of the plurality of subsets associated with the other of the greatest positive change or the greatest negative change in the one or more parameters; and identifying at least one bump or depression in the roadway based on the at least one beginning location and the at least one ending location. For example, map generation system 102 can include one or more computing systems including one or more processors (e.g., one or more servers, etc.).

In some non-limiting embodiments or aspects, autonomous vehicle 104 (e.g., vehicle computing system 106, etc.) includes one or more devices capable of obtaining sensor data associated with a detected object in an environment surrounding autonomous vehicle 104. For example, autonomous vehicle 104 can include one or more computing systems including one or more processors (e.g., one or more servers, etc.) and one or more devices capable of obtaining sensor data (e.g., one or more wide angle cameras, LIDAR, RADAR, accelerometers, gyroscopes etc.). As an example, autonomous vehicle 104 (e.g., vehicle computing system 106, etc.) includes one or more devices capable of obtaining sensor data associated with parameters (e.g., pitch, pitch range, yaw, yaw range, longitudinal acceleration, latitudinal speed, longitudinal speed, latitudinal speed, etc.) to determine the motion (e.g., positions, heading, pose, velocity, etc.) of the AV as it traverses a route in a geographic location. All of these different parameters present a different value when an AV traverses a bump and/or a depression. While the AV is traveling, it can factor in changes in elevation, such as hills or turns and pass them to map generation system 102 to factor into the map data associated with an environment surrounding autonomous vehicle 104 while controlling travel, operation, and/or routing of autonomous vehicle 104 based on map data, feature data, position data, state data, sensor data, motion data, test data, and/or the like. In such an example, the one or more devices may obtain sensor data associated with detecting parameters including a bump and/or a depression in an environment surrounding autonomous vehicle 104 while controlling travel and one or more functionalities associated with a fully autonomous mode of autonomous vehicle 104 on a driving path based on the map data, feature data, position data, state data, sensor data, motion data, and/or the like, for example, by controlling the one or more devices of autonomous vehicle 104 to detect sensor data in a geographic location based on map data, feature data, position data, state data, motion data, and/or the like. Further details regarding non-limiting embodiments or aspects of autonomous vehicle 104 are provided below with regard to FIG. 2.

In some non-limiting embodiments or aspects, map generation system 102 and/or autonomous vehicle 104 include one or more devices capable of receiving, storing, and/or providing map data (e.g., map data, AV map data, coverage map data, hybrid map data, submap data, Uber's Hexagonal Hierarchical Spatial Index (H3) data, Google's S2 geometry data, etc.) associated with a map (e.g., a map, a submap, an AV map, a coverage map, a hybrid map, an H3 cell, an S2 cell, etc.) of a geographic location (e.g., a country, a state, a city, a portion of a city, a township, a portion of a township, etc.). For example, maps can be used for routing autonomous vehicle 104 on a roadway specified in the map.

In some non-limiting embodiments or aspects, a road refers to a paved or otherwise improved path between two places that allows for travel by a vehicle (e.g., autonomous vehicle 104, etc.). Additionally or alternatively, a road includes a roadway and a sidewalk in proximity to (e.g., adjacent, near, next to, touching, etc.) the roadway. In some non-limiting embodiments or aspects, a roadway includes a portion of road on which a vehicle is intended to travel and is not restricted by a physical barrier or a separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments or aspects, a roadway is connected to another roadway, for example, a lane of a roadway is connected to another lane of the roadway and/or a lane of the roadway is connected to a lane of another roadway.

In some non-limiting embodiments or aspects, a roadway is associated with map data that defines one or more attributes of (e.g., metadata associated with) the roadway (e.g., attributes of a roadway in a geographic location, attributes of a segment of a roadway, attributes of a lane of a roadway, attributes of an edge of a roadway, attributes of a driving path of a roadway, etc.). In some non-limiting embodiments or aspects, an attribute of a roadway includes an edge of a road (e.g., a location of an edge of a road, a distance of location from an edge of a road, an indication whether a location is within an edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), a centerline of a roadway (e.g., an indication of a centerline path in at least one lane of the roadway for controlling autonomous vehicle 104 during operation (e.g., following, traveling, traversing, routing, etc.) on a driving path, etc.), a driving path of a roadway (e.g., one or more trajectories that autonomous vehicle 104 can traverse in the roadway and an indication of the location of at least one feature in the roadway a lateral distance from the driving path, etc.), one or more objects (e.g., a vehicle, a speed bump, an edge of a road, a traffic face, vegetation, a pedestrian, a structure, a building, a sign, a lamppost, signage, a traffic sign, a bicycle, a railway track, a hazardous object, etc.) in proximity to and/or within a road (e.g., objects in proximity to the edges of a road and/or within the edges of a road), a sidewalk of a road, and/or the like. In some non-limiting embodiments or aspects, a map of a geographic location includes one or more routes that include one or more roadways. In some non-limiting embodiments or aspects, map data associated with a map of the geographic location associates each roadway of the one or more roadways with an indication of whether an autonomous vehicle 104 can travel on that roadway.

In some non-limiting embodiments or aspects, a driving path includes one or more trajectories for autonomous vehicle 104 on a roadway. For example, a driving path may include feature data associated with features of the roadway (e.g., a section of curb, a marker, an object, etc.) for controlling autonomous vehicle 104 to autonomously determine objects in the roadway and/or feature data associated with longitudinal regions (e.g., a lane extending from the front or back edge of an AV, etc.) and with lateral regions (e.g., left and right edges of a lane in the roadway, etc.) of the driving path. As an example, a driving path includes a trajectory (e.g., a spline, a polyline, etc.), and a location of features (e.g., a portion of the feature, a section of the feature) in the roadway, with a link for transitioning between a point of origin and a destination point of the driving path based on at least one of heading information, curvature information, vehicle pose, acceleration information and/or the like, and intersections with features in the roadway (e.g., real objects, paint markers, curbs, other lane paths) of a lateral region (e.g., polygon) projecting from the path with objects of interest.

In some non-limiting embodiments or aspects, communication network 108 includes one or more wired and/or wireless networks. For example, communication network 108 includes a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
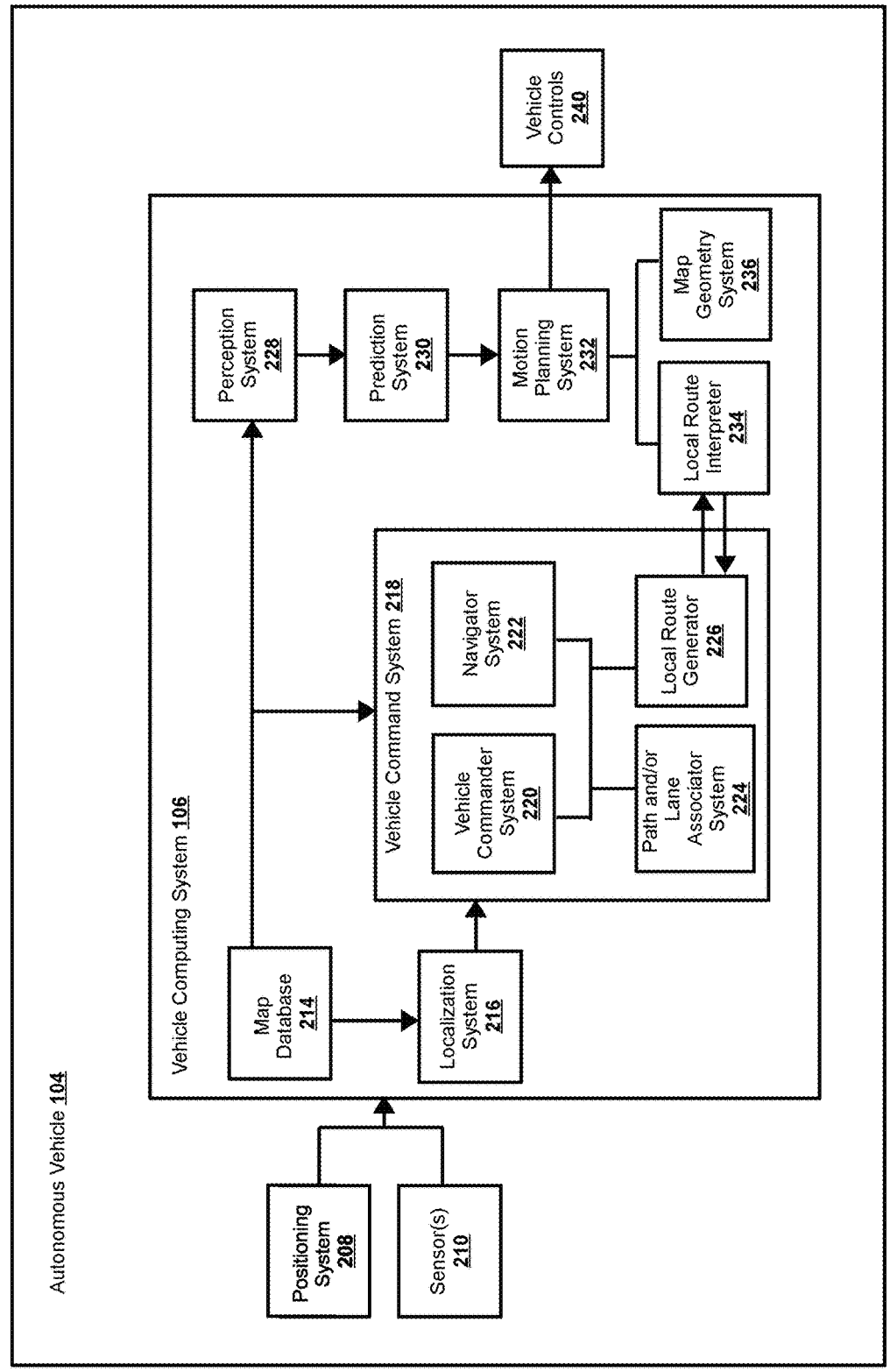
FIG. 2 is a diagram of a non-limiting embodiment or aspect of a system for controlling an autonomous vehicle shown in FIG. 1.

Referring now to FIG. 2, FIG. 2 is a diagram of a non-limiting embodiment or aspect of a system 200 for controlling autonomous vehicle 104. As shown in FIG. 2, vehicle computing system 106 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments or aspects, vehicle computing system 106 is connected to or includes positioning system 208. In some non-limiting embodiments or aspects, positioning system 208 determines a position (e.g., a current position, a past position, etc.) of autonomous vehicle 104. In some non-limiting embodiments or aspects, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments or aspects, the position of autonomous vehicle 104 is used by vehicle computing system 106.

In some non-limiting embodiments or aspects, vehicle computing system 106 receives sensor data from one or more sensors 210 that are coupled to or otherwise included in autonomous vehicle 104. For example, one or more sensors 210 includes a Light Detection and Ranging (LIDAR) system, a Radio Detection and Ranging (RADAR) system, one or more cameras (e.g., visible spectrum cameras, infrared cameras, etc.), one more devices for collecting positioning and pose data (e.g., pitch, latitude, longitude, altitude, etc.) and/or the like. In some non-limiting embodiments or aspects, one or more sensors 210 collect sensor data that includes data that describes a location (e.g., in three-dimensional space relative to autonomous vehicle 104) of points that correspond to a location of the autonomous vehicle 104. In some non-limiting embodiments or aspects, the sensor data includes data that describes a location of objects within the surrounding environment of autonomous vehicle 104. In some non-limiting embodiments or aspects, one or more sensors 210 collect sensor data that includes data that describes a location (e.g., in three-dimensional space relative to autonomous vehicle 104) of points that correspond to objects within the surrounding environment of autonomous vehicle 104.

In some non-limiting embodiments or aspects, the sensor data includes a location (e.g., a location in three-dimensional space relative to the LIDAR system) of a number of points (e.g., a point cloud) that correspond to objects that have reflected a ranging laser. In some non-limiting embodiments or aspects, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments or aspects, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments or aspects, the sensor data includes a location (e.g., a location in three-dimensional space relative to the RADAR system) of a number of points that correspond to objects that have reflected a ranging radio wave. In some non-limiting embodiments or aspects, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments or aspects, the RADAR system provides information about the location and/or the speed of an object relative to the RADAR system based on the radio waves.

In some non-limiting embodiments or aspects, image processing techniques (e.g., range imaging techniques, as an example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments or aspects, map database 214 provides detailed information associated with the map, features of the roadway in the geographic location, and information about the surrounding environment of autonomous vehicle 104 for autonomous vehicle 104 to use while driving (e.g., traversing a route, planning a route, determining a motion plan, controlling autonomous vehicle 104, etc.).

In some non-limiting embodiments or aspects, vehicle computing system 106 receives a vehicle pose from localization system 216 based on one or more sensors 210 that are coupled to, or otherwise included in, autonomous vehicle 104. In some non-limiting embodiments or aspects, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer, for determining a map-relative vehicle pose. For example, the low quality pose localizer determines a low quality pose estimate in response to receiving position data from positioning system 208 for operating (e.g., routing, navigating, controlling, etc.) autonomous vehicle 104 under manual control (e.g., in a coverage lane, on a coverage driving path, etc.). In some non-limiting embodiments or aspects, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane, on an AV driving path, etc.).

In some non-limiting embodiments or aspects, vehicle command system 218 includes vehicle commander system 220, navigator system 222, path and/or lane associator system 224, and local route generator 226 that cooperate to route and/or navigate autonomous vehicle 104 in a geographic location. In some non-limiting embodiments or aspects, vehicle commander system 220 provides tracking of a current objective of autonomous vehicle 104, such as a current service, a target pose, a coverage plan (e.g., development testing, etc.), and/or the like. In some non-limiting embodiments or aspects, navigator system 222 determines and/or provides a route plan (e.g., a route between a starting location or a current location and a destination location, etc.) for autonomous vehicle 104 based on a current state of autonomous vehicle 104, map data (e.g., lane graph, driving paths, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) and/or one or more driving paths (e.g., a current driving path, a future driving path, etc.) in one or more roadways that autonomous vehicle 104 can traverse on a route to a destination location (e.g., a target location, a trip drop-off location, etc.).

In some non-limiting embodiments or aspects, navigator system 222 determines a route plan based on one or more lanes and/or one or more driving paths received from path and/or lane associator system 224. In some non-limiting embodiments or aspects, path and/or lane associator system 224 determines one or more lanes and/or one or more driving paths of a route in response to receiving a vehicle pose from localization system 216. For example, path and/or lane associator system 224 determines, based on the vehicle pose, that autonomous vehicle 104 is on a coverage lane and/or a coverage driving path, and in response to determining that autonomous vehicle 104 is on the coverage lane and/or the coverage driving path, determines one or more candidate lanes (e.g., routable lanes, etc.) and/or one or more candidate driving paths (e.g., routable driving paths, etc.) within a distance of the vehicle pose associated with autonomous vehicle 104. For example, path and/or lane associator system 224 determines, based on the vehicle pose, that autonomous vehicle 104 is on an AV lane and/or an AV driving path, and in response to determining that autonomous vehicle 104 is on the AV lane and/or the AV driving path, determines one or more candidate lanes (e.g., routable lanes, etc.) and/or one or more candidate driving paths (e.g., routable driving paths, etc.) within a distance of the vehicle pose associated with autonomous vehicle 104. In some non-limiting embodiments or aspects, navigator system 222 generates a cost function for each of the one or more candidate lanes and/or the one or more candidate driving paths that autonomous vehicle 104 may traverse on a route to a destination location. For example, navigator system 222 generates a cost function that describes a cost (e.g., a cost over a time period) of following (e.g., adhering to) one or more lanes and/or one or more driving paths that may be used to reach the destination location (e.g., a target pose, etc.).

In some non-limiting embodiments or aspects, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments or aspects, local route generator 226 may determine a number of route options based on a predetermined number, a current location of the AV, a current service of the AV, and/or the like.

In some non-limiting embodiments or aspects, perception system 228 detects and/or tracks objects (e.g., bumps, depressions, vehicles, pedestrians, bicycles, and the like) that are proximate to (e.g., in proximity to the surrounding environment of) autonomous vehicle 104 over a time period. In some non-limiting embodiments or aspects, perception system 228 can retrieve (e.g., obtain) map data from map database 214 that provides detailed information about the surrounding environment of autonomous vehicle 104.

In some non-limiting embodiments or aspects, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments or aspects, the state data associated with an object includes data associated with a location of the object (e.g., a position, a current position, an estimated position, etc.), data associated with a speed of the object (e.g., a magnitude of velocity of the object, etc.), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments or aspects, perception system 228 determines state data for an object over a number of iterations of determining state data. For example, perception system 228 updates the state data for each object of a plurality of objects during each iteration.

In some non-limiting embodiments or aspects, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments or aspects, prediction system 230 predicts future movement of an object according to a probable class of the objects, one or more conditions, one or more observed locations of the object, and/or map data. For example, prediction system 230 predicts a future movement of an object according to one or more prior probability distributions including mover classifications, one or more motion paths, and/or one or more driving paths based on detection of the object and/or movement of the object.

In some non-limiting embodiments or aspects, prediction system 230 predicts that an object will adhere to the object's direction of travel according to the speed of the object. In some non-limiting embodiments or aspects, prediction system 230 uses machine learning techniques or modeling techniques to make a prediction based on state data associated with an object.

In some non-limiting embodiments or aspects, prediction system 230 predicts future movement of an object according to one or more observed locations of a static object in the roadway (e.g., a speed bump, a drainage ditch, etc.), and/or map data.

In some non-limiting embodiments or aspects, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments or aspects, motion planning system 232 receives a route plan as a command from navigator system 222. In some non-limiting embodiments or aspects, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments or aspects, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments or aspects, motion planning system 232 determines a cost function (e.g., a cost field, etc.) of following a motion plan. For example, motion planning system 232 determines a motion plan for autonomous vehicle 104 based on one or more cost functions. In some non-limiting embodiments or aspects, motion planning system 232 determines a motion plan (e.g., a selected motion plan, an optimized motion plan, a preferred motion plan, etc.) that minimizes a cost function. In some non-limiting embodiments or aspects, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments or aspects, motion planning system 232 can determine a motion plan for autonomous vehicle 104 based on the predicted future locations and/or motion paths for the object provided by the prediction system 230 and/or the state data for the object provided by the perception system 228. Stated differently, given information about current locations of objects and/or predicted future locations and/or motion paths of objects, the motion planning system 232 can determine a motion plan for autonomous vehicle 104 that navigates autonomous vehicle 104 relative to the objects at such locations according to the cost function.

In some non-limiting embodiments or aspects, motion planning system 232 communicates with local route interpreter 234 and map geometry system 236. In some non-limiting embodiments or aspects, local route interpreter 234 may receive and/or process route options from local route generator 226. For example, local route interpreter 234 may determine a new or updated route for travel of autonomous vehicle 104. As an example, one or more lanes and/or one or more driving paths in a local route may be determined by local route interpreter 234 and map geometry system 236. For example, local route interpreter 234 can determine a route option and map geometry system 236 determines one or more lanes and/or one or more driving paths in the route option for controlling the motion of autonomous vehicle 104.

Figure 3:
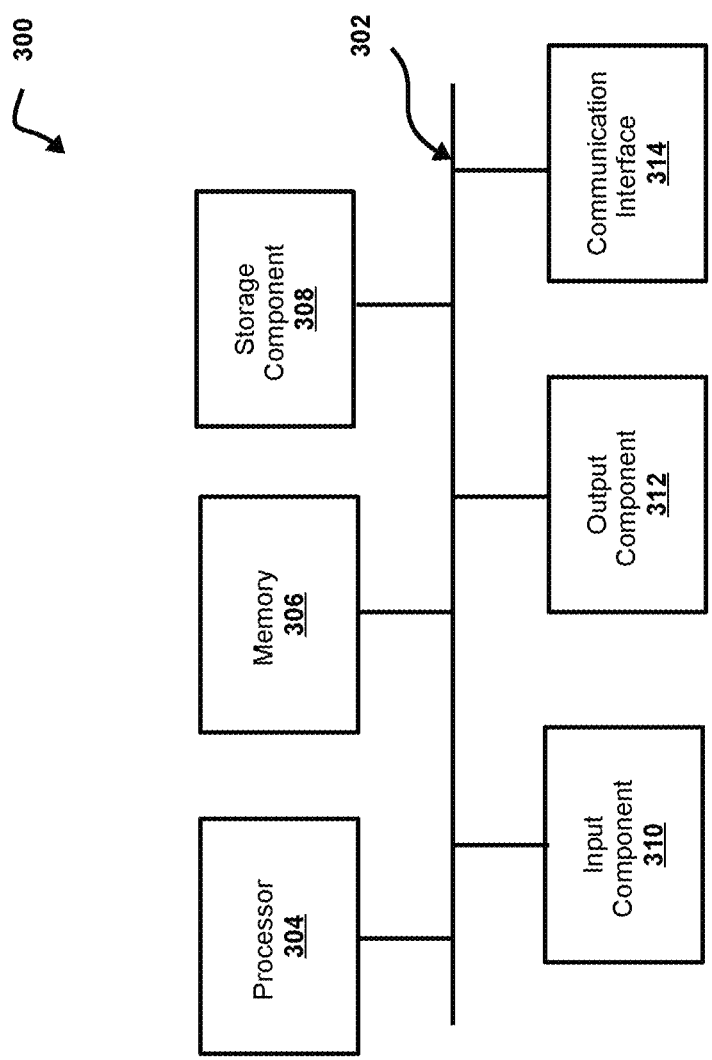
FIG. 3 is a diagram of a non-limiting embodiment or aspect of components of one or more devices and/or one or more systems of FIGS. 1 and 2.

Referring now to FIG. 3, FIG. 3 is a diagram of example components of a device 300. Device 300 can correspond to one or more devices of map generation system 102 and/or one or more devices of (e.g., one or more devices of a system of) autonomous vehicle 104. In some non-limiting embodiments or aspects, one or more devices of map generation system 102 and/or one or more devices of (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of, or in combination with, software instructions to perform one or more processes described herein. Thus, embodiments or aspects described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. In some non-limiting embodiments or aspects, the information may include data (e.g., sensor data, log data, one or more prior probability distributions, etc.) associated with one or more traversals of a roadway by one or more vehicles.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
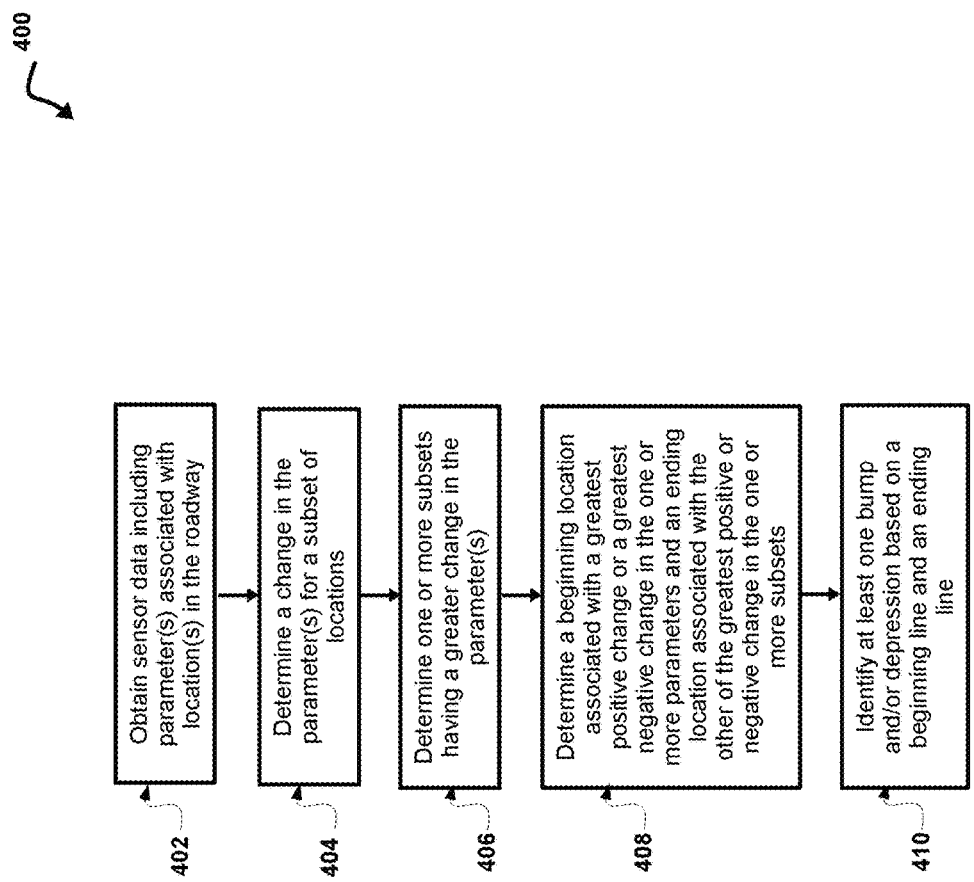
FIG. 4 is a flowchart of a non-limiting embodiment or aspect of a process for identifying a bump and/or a depression in a roadway.

Referring now to FIG. 4, FIG. 4 is a flowchart of a non-limiting embodiment or aspect of a process 400 for identifying a bump and/or depression. In some non-limiting embodiments or aspects, one or more of the steps of process 400 are performed (e.g., completely, partially, etc.) by map generation system 102 (e.g., one or more devices of map generation system 102, etc.). In some non-limiting embodiments or aspects, one or more of the steps of process 400 are performed (e.g., completely, partially, etc.) by another device or a group of devices separate from or including map generation system 102, such as one or more device of (e.g., one or more devices of a system of) autonomous vehicle 104.

As shown in FIG. 4, at step 402, process 400 includes obtaining sensor data including a parameter associated with a location in the roadway. As an example, map generation system 102 obtains sensor data including a parameter associated with a location in the roadway. As an example, map generation system 102 obtains (e.g., receives, retrieves, etc.) sensor data associated with one or more traversals of a roadway in a geographic location by one or more vehicles, wherein the sensor data includes one or more parameters associated with a plurality of locations in the roadway.

In some non-limiting embodiments or aspects, map generation system 102 obtains sensor data that includes parameter information associated with one or more parameters collected as a vehicle transitions through a sequence of poses while traversing a roadway in a geographic location. As an example, map generation system 102 obtains sensor data collected by autonomous vehicles and/or non-autonomous, human controlled vehicles as the vehicles travel on a roadway in a geographic location. For example, the sensor data may be collected by vehicles (e.g., a map collection vehicle, etc.) during travel, specifically for collecting data for mapping and/or during normal autonomy operations (e.g., non-mapping specific, etc.). As an example, vehicle computing system 106 of autonomous vehicle 104 can obtain sensor data that has been stored in vehicle logs as autonomous vehicle 104 traverses a roadway. The sensor data in the vehicle logs can be stored locally and/or sent to map generation system 102 to be processed (e.g., stored, chunked, aggregated, etc.), and include one or more parameters, such as, for example, x-value coordinates (e.g., a latitude, etc.), y-value coordinates (e.g., a longitude, etc.), z-value coordinates (e.g., an elevation, height, or altitude relative to the ground and/or sea level, etc.), heading (e.g., a yaw, etc.), pitch of the vehicle (e.g., a pitch angle, grade, or incline that is positive for upward movement of the vehicle nose and negative for downward movement of the vehicle nose, etc.), pitch rate, longitudinal speed, longitudinal acceleration, yaw, yaw rate, latitudinal speed, latitudinal acceleration, roll, roll rate, and/or the like.

As shown in FIG. 4, at step 404, process 400 includes determining a change in the parameter for a subset of locations. For example, map generation system 102 determines a change in the parameter for a subset of locations. As an example, map generation system 102 determines for each subset of a plurality of subsets of the plurality of locations, a change in the one or more parameters over that subset of locations.

In some non-limiting embodiments or aspects, map generation system 102 determines a change in the one or more parameters for a subset of locations by identifying sensor data associated with a particular subset of a geographic location (e.g., a roadway, a subregion, a submap, etc.). For example, the identified sensor data may include a chunk of sensor data (e.g., a plurality of chunks, etc.) associated with a bump or depression in a length of a roadway, an area of the map, a geographic location, and/or the like. Map generation system 102 may generate a plurality of subsets of the plurality of locations by generating one or more chunks that correspond to a subset (e.g. a reduced number of subsets, etc.) of the plurality of locations. In some non-limiting embodiments or aspects, map generation system 102 can divide a chunk of sensor data into one or more segments based on a length of roadway. As an example, the map generation system 102 generates one or more segments of sensor data associated with a predetermined length of the roadway (e.g., a segment of car-length distance (roughly 4.95 meters), one half car-length, etc.). Map generation system 102 may store the sensor data associated with a chunk.

In some non-limiting embodiments or aspects, map generation system 102 analyzes one or more parameters associated with each chunk of the plurality of chunks that correspond to a subset of the plurality of locations to determine a change in the one or more parameters. As an example, map generation system 102 determines, for each subset of a plurality of subsets of the plurality of locations, a change in the one or more parameters over that subset of locations. For example, in some non-limiting embodiments or aspects, map generation system 102 generates statistics (e.g., a standard deviation, an average value, a minimum/maximum value, etc.) based on parameters (e.g., pitch values, z-values, etc.) associated with a chunk of a plurality of chunks. Alternatively, in some examples, statistics may be generated based on one or more other parameters, a combination of parameters, and/or the like.

As shown in FIG. 4, at step 406, process 400 includes determining one or more subsets having a greater change in the one or more parameters. As an example, map generation system 102 determines one or more subsets having a greater change in the one or more parameters. For example, map generation system 102 determines one or more subsets of the plurality of subsets having a greater change in the one or more parameters than one or more other subsets of the plurality of subsets.

In some non-limiting embodiments or aspects, map generation system 102 determines one or more subsets (e.g., one or more chunks) with a likelihood of containing a bump or depression based on a greater change in the subset (e.g., a chunk, etc.) of the plurality of subsets of the plurality of locations by comparing statistics for the subset to statistics of any other subset of the plurality of subsets. For example, map generation system 102 determines a greater change in the one or more subsets (e.g., a chunk, etc.) of a plurality of subsets of the plurality of locations based on a subset rank (e.g., $90^{th}$ percentile, etc.) with respect to the other subsets of the plurality of locations. In such an example, the subset's rank is based on the statistics (e.g., a standard deviation, an average value, a minimum/maximum value, etc.) determined from the one or more parameters (e.g., a pitch value, etc.) associated with the subset (e.g., the chunk, etc.).

In some non-limiting embodiments or aspects, map generation system 102 classifies the one or more subsets as having a likelihood of including a bump or depression.

As shown in FIG. 4, at step 408, process 400 includes determining a beginning location associated with a greatest positive change or a greatest negative change in the one or more parameters and an ending location associated with the other of the greatest positive change or greatest negative change in the one or more subsets. As an example, map generation system 102 determines a beginning location (e.g., a location associated with a leading edge of a bump or depression which a vehicle initially traverses, etc.) associated with a greatest positive change or a greatest negative change in the one or more parameters and an ending location associated with the other of the greatest positive change or greatest negative change in the one or more subsets. For example, map generation system 102 determines at least one beginning location (e.g., an entry point of a bump, an entry point of a depression, etc.) in the one or more subsets of the plurality of subsets associated with a greatest positive change or a greatest negative change in the one or more parameters and at least one ending location (e.g., an exit point of a bump, an exit point of a depression, etc.) in the one or more subsets of the plurality of subsets associated with the other of the greatest positive change or the greatest negative change in the one or more parameters.

In some non-limiting embodiments or aspects, map generation system 102 determines the beginning location of a bump in the one or more subsets by finding a point of greatest positive change in a direction of travel of autonomous vehicle 104. For example, map generation system 102 determines a beginning location of a bump at a starting point (e.g., an entry point, a point of a motion path, a point of a prior mover, etc.) having a greatest positive change in the one or more parameters (e.g. a pitch, etc.) of the one or more subsets in a direction of travel (e.g., a direction of the roadway, lane, etc.) of autonomous vehicle 104. In such an example, map generation system 102 determines an ending location of a bump at a point (e.g., an exit point, a point of a motion path, a point of a prior mover, etc.) having a greatest negative change in the one or more parameters (e.g. a pitch, etc.) of the one or more subsets in a direction of travel (e.g., a direction of the roadway, a direction of travel of a mover, direction of travel of autonomous vehicle 104, etc.).

In some non-limiting embodiments or aspects, map generation system 102 determines a beginning location of a depression in the one or more subsets by finding a point of greatest negative change in a direction of travel. For example, map generation system 102 determines a beginning location of a depression at a starting point having a greatest negative change in the one or more parameters (e.g. a pitch, etc.) of the one or more subsets in a direction of travel (e.g., a direction of the roadway, lane, etc.) of autonomous vehicle 104. In such an example, map generation system 102 determines an ending location of a depression at a point (e.g., an exit point, a point of a motion path, a point of a prior mover, etc.) having a greatest positive change in the one or more parameters (e.g. a pitch, etc.) of the one or more subsets in a direction of travel (e.g., a direction of the roadway, a direction of travel of a mover, direction of travel of autonomous vehicle 104, etc.).

In some non-limiting embodiments or aspects, map generation system 102 determines and/or labels a beginning location, an ending location, or both a beginning and ending location associated with an area of the bump or depression in the geographic location.

Further details regarding non-limiting embodiments or aspects of step 408 of process 400 are provided below with regard to FIG. 5.

As shown in FIG. 4, at step 410, process 400 includes identifying at least one bump and/or depression based on a starting line and an ending line. For example, map generation system 102 identifies at least one bump or depression in the roadway based on the at least one beginning location and the at least one ending location. As an example, map generation system 102 generates a map including an identification of a bump or depression in an area of a map (e.g., a pixel, a group of pixels, an element, a cell, etc.) corresponding to the starting line and ending line.

In some non-limiting embodiments or aspects, map generation system 102 generates a probability map (e.g., a histogram, a heatmap, etc.) associated with a bump or depression in proximity to and/or within the road to indicate a probability mass which is concentrated around the bump or depression (e.g., a greater number or lesser number of detections of a bump or depression in an area as compared to any other area of the map, etc.). For example, map generation system 102 may aggregate a plurality of detected bumps or depressions in an area of a map having a shared location in an area of the map (e.g., a pattern in the sensor data indicating an overlap, etc.) between a beginning line and ending line. As an example, map generation system 102 determines two or more subsets of a plurality of subsets of a plurality of locations in sensor data which include a bump or depression (e.g., a detection of a polygon based on different collections of sensor data, different collection vehicles, etc.). In such an example, map generation system 102 can generate a probability map having a probability mass associated with a bump or depression (e.g., a first subset of the two or more subsets overlapping with at least a portion of a second subset of the two or more subsets, etc.). In some examples, a map of a bump or depression can include a map layer having a visual indication of a probability that an area of the map includes a bump or a depression, such as, a histogram associated with a bump or depression in proximity to and/or within a road (e.g., a histogram of the dimensions (e.g., height, length, depth, etc.) of a bump or depression, a histogram of a distance of a bump or depression from an edge of a road, a histogram of a bump or depression within and/or outside of an edge of a road, etc.), a histogram of a bump or depression in a roadway of a road (e.g., a histogram of a bump or depression in a lane of a roadway of a road, a histogram of a bump or depression in a travel lane of a roadway, a histogram of a bump or depression in a parking lane of a roadway, etc.), and/or a histogram of a bump or depression beyond a boundary of a road (e.g., a drainage ditch, etc.).

In some non-limiting embodiments or aspects, map generation system 102 generates a bump or depression region in a map of the geographic location corresponding to a map area associated with at least one bump or depression. For example, map generation system 102 provides a map including one or more selectable regions having a selectable factor in the map for indicating and/or selecting a location of a bump or a depression in the map of the geographic location. In some examples, map generation system 102 updates a map based on a selection of a selectable factor in the map for indicating a location of a bump or a depression in the map of the geographic location. In some examples, map generation system 102 provides a plurality of selectable factors to update a position, size, or shape of a representation of a bump or depression in a map.

In some non-limiting embodiments or aspects, map generation system 102 generates a histogram (e.g., a two dimensional histogram, a two dimensional histogram of cloud points representing a feature of a road, a normalized histogram, etc.) associated with a bump or depression including a value (e.g., a number between 0-255) of a color of each element (e.g., a pixel, a cell, etc.) in an image of the geographic location. In some non-limiting embodiments or aspects, the value of the color may vary among color shades, such as red, green, and blue, to indicate a probability of an object.

In some non-limiting embodiments or aspects, map generation system 102 may generate a map layer based on a top-down camera image (e.g., a synthesized Red Green Blue (RGB) image) of a bump or depression in the geographic location. In some non-limiting embodiments or aspects, map generation system 102 generates a bump or depression area in a top-down camera image based on identifying a bump or depression. For example, map generation system 102 may obtain a top-down image of a bump or depression of a roadway to overlay bump or depression imagery in an area corresponding to the geographic location of a bump or depression.

Additionally or alternatively, a map layer may include a histogram of an intensity of a color (e.g., black, white, etc.) in the image of the geographic location. In some non-limiting embodiments or aspects, map generation system 102 generates the histogram having an intensity of the color associated with a homogenous area of a geographic location having a bump or depression. For example, map generation system 102 may generate a histogram for a roadway (e.g., a travel lane, a parking lane, etc.) in the geographic location based on the intensity of the color being the same in the portion of the geographic location that includes the bump or depression.

In some non-limiting embodiments or aspects, map generation system 102 generates a region in at least one map area including a location of the at least one bump or depression based on an aggregation of a plurality of beginning lines in the one or more subsets corresponding to a beginning line of the region and an aggregation of a plurality of ending lines in the one or more subsets corresponding to an ending line of the region.

In some non-limiting embodiments or aspects, process 400 includes verifying the at least one map area associated with a region of at least one bump or depression. For example, map generation system 102 provides one or more hints (e.g., information associated with where a bump or depression may be located, etc.) in a map layer for indicating a region may be associated with a bump or depression. In such an example, one or more hints can be used to verify the map area (e.g., a bump, depression, etc.). An operator may review the hints to verify or identify a bump or depression and/or verify or identify a correct location of a bump or depression.

In some non-limiting embodiments or aspects, for example, map generation system 102 may output map data to autonomous vehicle 104, including one or more bumps or depressions determined by identifying a region associated with a bump or depression in a geographic location. In some non-limiting embodiments or aspects, map generation system 102 may output map data associated with a bump or depression map (e.g., a map layer, etc.) to autonomous vehicle 104 based on a user verifying a bump or depression of an AV map (e.g., one or more map layers, etc.).

In some non-limiting embodiments or aspects, map generation system 102 and/or autonomous vehicle 104 may compare a probability associated with an element of a bump or depression to a threshold value to determine a driving path. In such an example, map generation system 102 and/or autonomous vehicle 104 can determine that an element of the map includes a bump or depression based on the probability associated with an element of a bump or depression map satisfying a threshold value.

Figure 5:
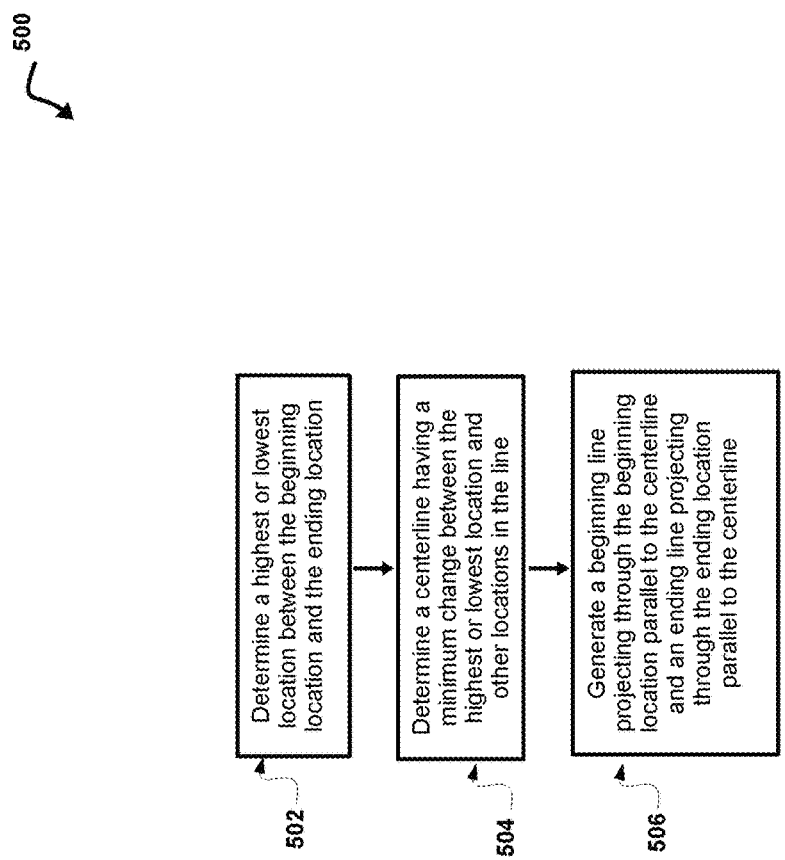
FIG. 5 is a flowchart of a non-limiting embodiment or aspect of a process for identifying a bump and/or a depression in a roadway.

Referring now to FIG. 5, FIG. 5 is a flowchart of a non-limiting embodiment or aspect of a process 500 for identifying a bump and/or depression. In some non-limiting embodiments or aspects, one or more of the steps of process 500 are performed (e.g., completely, partially, etc.) by map generation system 102 (e.g., one or more devices of map generation system 102, etc.). In some non-limiting embodiments or aspects, one or more of the steps of process 500 are performed (e.g., completely, partially, etc.) by another device or a group of devices separate from or including map generation system 102, such as one or more devices of (e.g., one or more devices of a system of) autonomous vehicle 104.

As shown in FIG. 5, at step 502, process 500 includes determining a highest or lowest location between the beginning location and the ending location. As an example, map generation system 102 determines a highest or lowest location between the beginning location and the ending location. As an example, map generation system 102 determines at least one highest or lowest location between the at least one beginning location and the at least one ending location in the one or more subsets of the plurality of subsets based on at least one parameter associated with locations in a line between the at least one beginning location and the at least one ending location in the roadway.

In some non-limiting embodiments or aspects, map generation system 102 determines the line between the beginning location and the ending location as a shortest line of a plurality of lines between the beginning location and the ending location.

In some non-limiting embodiments or aspects, map generation system 102 determines at least one parameter (e.g., a z-value, etc.) associated with a location in a line projecting between at least one beginning location and at least one ending location in the roadway. As an example, map generation system 102 determines a z-value (e.g., one or more z-values at predefined intervals, etc.) for a location of a line projecting between a beginning location and an ending location. In some examples, map generation system 102 compares a z-value of a line projecting between a beginning location and an ending location with any other z-values of the one or more z-values of the line to determine a peak value (e.g., a greatest positive or negative value, a highest z-value, a lowest z-value, etc.).

As shown in FIG. 5, at step 504, process 500 includes determining a centerline having a minimum change between the highest or lowest location and other locations in the line. For example, map generation system 102 determines a centerline having a minimum change between the highest or lowest location (e.g., a location associated with a peak value, etc.) and other locations in the line. As an example, map generation system 102 determines a centerline from a plurality of lines projecting at a plurality of angles through the peak location (e.g., a location associated with a peak value, etc.) having a minimum change in one or more z-values at points in the line.

In some non-limiting embodiments or aspects, map generation system 102 determines a centerline by generating a plurality of lines projecting at various different angles from the peak location (e.g., a location associated with a largest positive z-value for a bump, a location associated with a largest negative z-value for a depression, etc.). In such an example, map generation system 102 determines the centerline by comparing z-values of the plurality of lines to determine a line having a minimum change in z-values as compared to any other lines projecting through the peak location. As an example, map generation system 102 generates one or more lines (e.g., rays, projections, etc.) projecting at different angles through the peak location. Map generation system 102 then compares the one or more lines to any of the other one or more lines through the peak location. In some examples, map generation system 102 may determine lines in a manner to ensure variation in points as compared to any of the other lines. In some examples, map generation system 102 determines a centerline by determining a standard deviation for any line of the one or more lines. For example, map generation system 102 determines the centerline as the line of the one or more lines having the lowest standard deviation.

As shown in FIG. 5, at step 506, process 500 includes generating a beginning line projecting through the beginning location parallel to the centerline and an ending line projecting through the ending location parallel to the centerline. As an example, map generation system 102 generates a beginning line projecting through the at least one beginning location in the one or more subsets parallel to the centerline and an ending line projecting through the at least one ending location in the one or more subsets parallel to the centerline. For example, map generation system 102 generates the beginning line and ending line based on an angle used to generate a centerline. In such an example, map generation system 102 generates a beginning line projecting from a beginning location along an angle equal to the angle used to generate the centerline. Similarly, map generation system 102 generates an ending line projecting from an ending location along an angle equal to the angle used to generate the beginning line and centerline.

In some non-limiting embodiments or aspects, map generation system 102 determines an edge (e.g., a right edge, a left edge, etc.) of a bump or depression where a beginning line and an ending line reach a road edge boundary (e.g., ends at a right edge and/or left edge of a roadway, a left or right boundary of a beginning line, a left or right boundary of an ending line, etc.). For example, map generation system 102 determines a right edge or a left edge of a bump or depression by determining a respective point associated with a right edge of the roadway and/or a respective point associated with a left edge of the roadway. A right edge and/or left edge of the roadway can be used to connect a beginning line associated with a beginning location of a bump or depression (e.g., an entry point of a bump or depression, starting point of the greatest positive or negative change, etc.) and an ending line associated with an ending location of a bump or depression (e.g., an exit point of a bump or depression, ending point of the greatest positive or negative change, etc.) on each side of the bump or depression relative to the right or left edge of the roadway (e.g., right or left road edge boundary, a right or left boundary of a beginning line, a right or left boundary of an ending line, etc.) to determine a right or left edge of the bump or depression.

In some non-limiting embodiments or aspects, a right edge and a left edge correspond to at least one of an edge of a road or an edge of an intersection on a respective side of the bump or depression. For example, map generation system 102 generates an edge by projecting a beginning line (e.g., a beginning line, an ending line, etc.) outward laterally to an edge of the roadway (e.g., a road edge boundary, a right or left boundary of a beginning line, a right or left boundary of an ending line, etc.). In such an example, map generation system 102 generates an edge of the bump or depression in alignment (e.g., substantially aligned, etc.) with an edge of a roadway and/or intersection. As an example, map generation system 102 determines an edge of a bump or depression by determining an edge of a roadway and correlating an angle of the edge of a bump or depression with the edge of roadway.

In some non-limiting embodiments or aspects, map generation system 102 determines at least one of a beginning line and/or ending line are in a roadway (e.g., in an area of a roadway where a beginning line or ending line projects to a road boundary, etc.) to determine an edge of the bump or depression. In such an example, map generation system 102 generates an edge of a bump or depression (e.g., a right edge and/or left edge, etc.) based on a determined road edge boundary. For example, map generation system 102 determines an edge of the bump or depression (e.g., the right edge or left edge, etc.) based on an angle between points of the road edge boundary (e.g., points aligned with a beginning and ending line of a bump or depression, etc.).

In some non-limiting embodiments or aspects, map generation system 102 may determine both the beginning line and ending line are in an intersection (e.g., within an area of the roadway, etc.) to determine an edge of the bump or depression. In such an example, map generation system 102 determines an edge of a bump and/or depression by determining an edge of a roadway in an intersection that is physically closest to any point in the bump or depression (e.g., a point of an edge of an intersection closest to a point on the beginning line or ending line, etc.). In some examples, map generation system 102 may compare two roadway edges within an intersection that are equally close or within a range (e.g., similarly close, equidistant, etc.) to a beginning line or ending line of a bump or depression to determine which of the roadway edges of the intersection has an angle closer to being perpendicular to the beginning line or ending line of the bump or depression. For example, map generation system 102 may determine a road edge associated with a roadway in an intersection that is closer to being perpendicular (e.g., physically closest, etc.) to the beginning line or ending line than any other road edge that is associated with any other roadway in the intersection. Map generation system 102 may generate an edge of the bump or depression (e.g., the right edge or left edge, etc.) based on the angle of the edge of a roadway in an intersection determined to be closer to perpendicular than any other edge of a roadway in the intersection. In such an example, map generation system 102 generates an angle of a bump or depression edge that mirrors the angle of the edge (e.g., a contour, a shape, etc.) of the roadway in the intersection determined closest to being perpendicular (e.g., physically closest, closest to 90°, closest to a right angle, etc.).

In some non-limiting embodiments or aspects, map generation system 102 generates a right edge connecting a beginning line and an ending line based on at least one parameter of one or more locations between the beginning line and the ending line, a parameter of an edge of a roadway, a parameter of a right or left edge, and/or the like.

In some non-limiting embodiments or aspects, map generation system 102, generates a left and/or a right edge for connecting a beginning line and an ending line based on at least one automatically detected road edge boundary (e.g., a road edge, a lane edge, an intersection edge, etc.). For example, map generation system 102 generates a left edge and/or a right edge by automatically determining a drivable surface path and one or more road edge boundaries of a geographic location in the map.

Figure 6A:
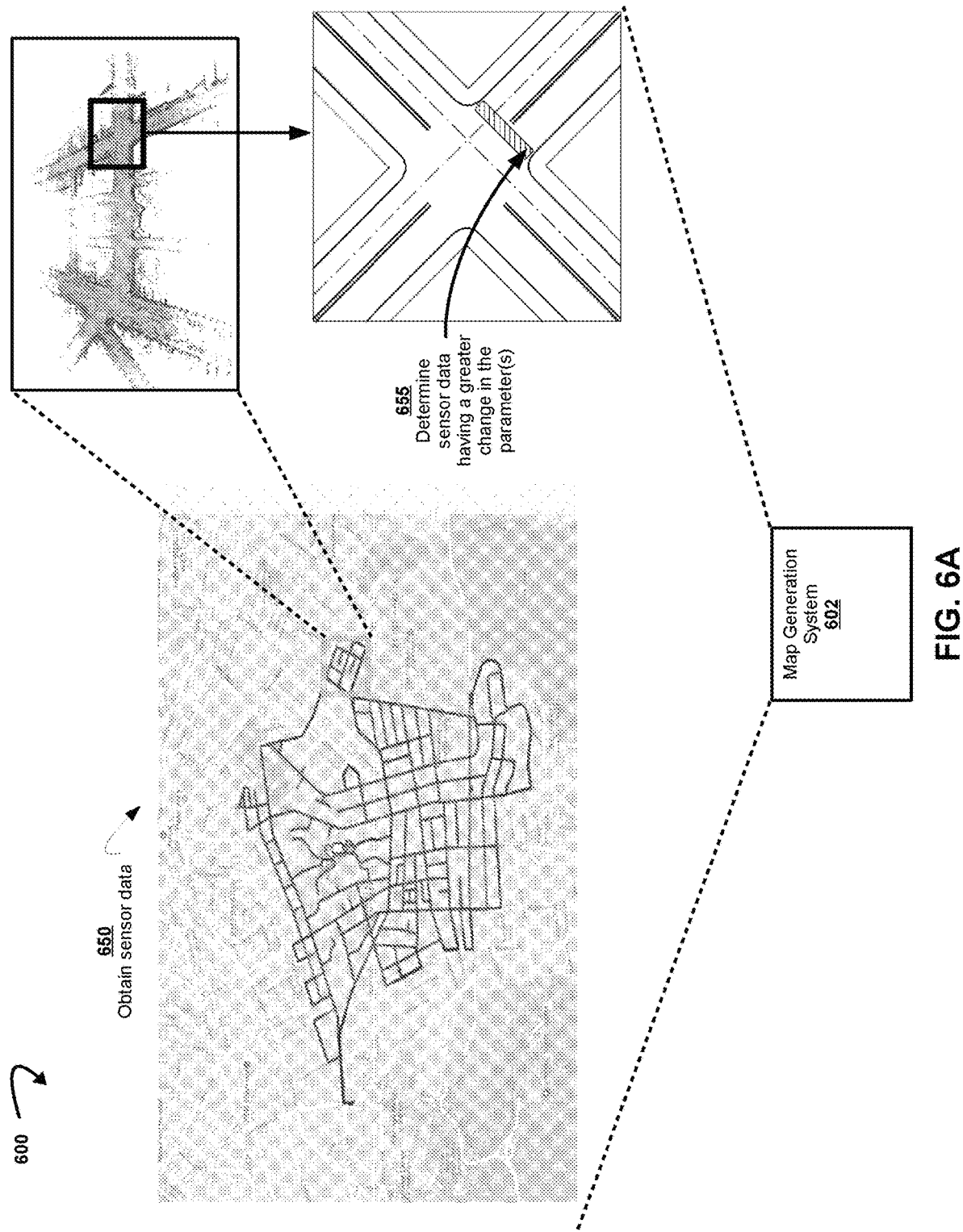
Figure 6B:
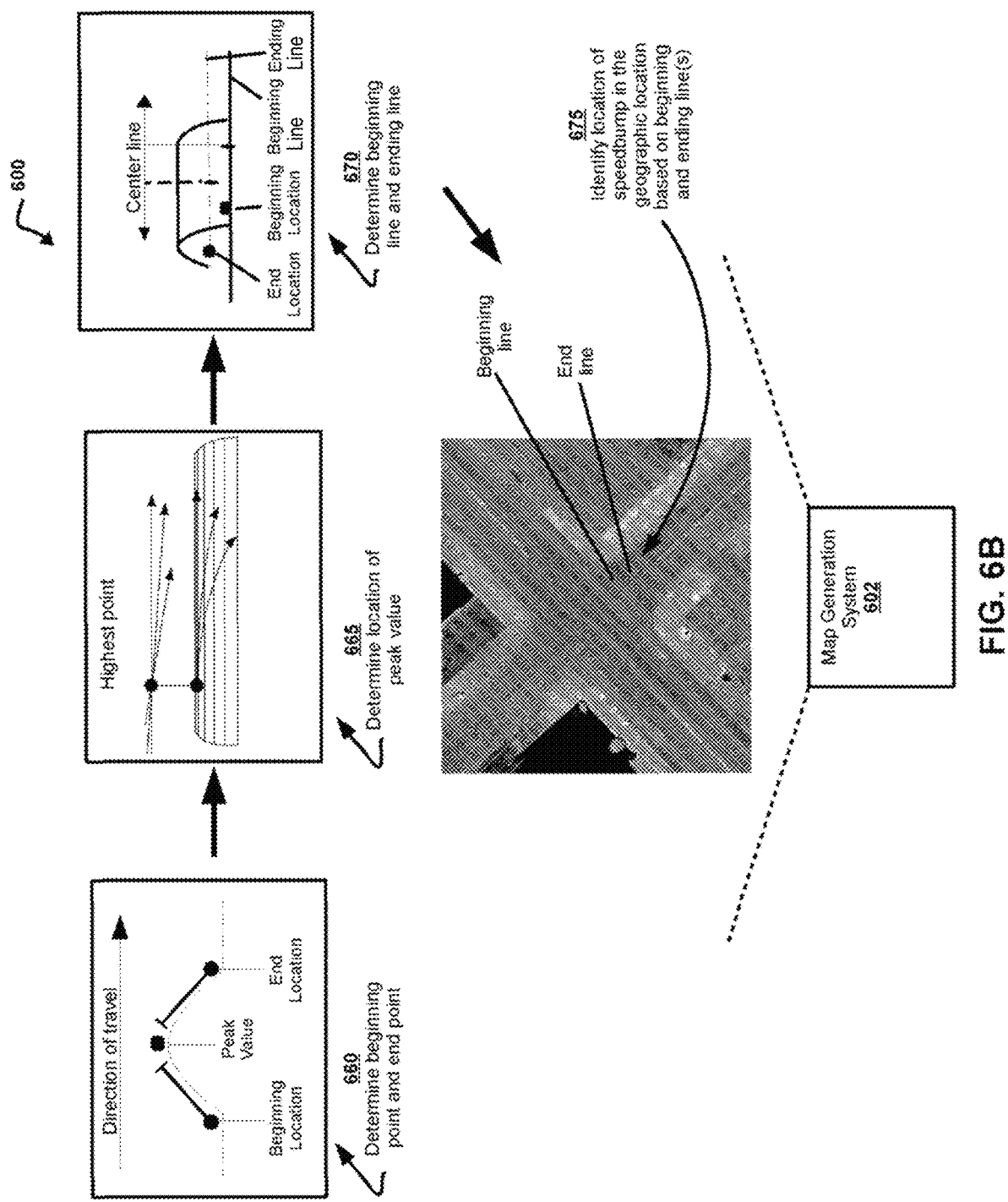

Referring now to FIGS. 6A-6C, FIGS. 6A-6C are diagrams of an overview of a non-limiting embodiment of an implementation 600 relating to one or more processes disclosed herein. As shown in FIGS. 6A-6C, implementation 600 includes map generation system 602 and autonomous vehicle 604, including vehicle computing system 606. In some non-limiting embodiments or aspects, map generation system 602 can be the same or similar to map generation system 102. In some non-limiting embodiments or aspects, autonomous vehicle 604 can be the same or similar to autonomous vehicle 104. In some non-limiting embodiments or aspects, vehicle computing system 606 can be the same or similar to vehicle computing system 106.

As shown by reference number 650 in FIG. 6A, implementation 600 includes obtaining sensor data including one or more parameters associated with a geographic location including a roadway. For example, implementation 600 may automatically identify bumps and/or depressions based on sensor data associated with one or more traversals of a roadway by one or more vehicles. As an example, autonomous vehicle 604 (e.g., vehicle computing system 606, etc.) includes one or more devices capable of obtaining sensor data associated with a detected object in an environment surrounding autonomous vehicle 604. For example, autonomous vehicle 604 can include one or more computing systems having one or more processors (e.g., one or more servers, etc.) and one or more devices capable of obtaining sensor data (e.g., one or more wide angle cameras, LIDAR, RADAR, accelerometers, gyroscopes etc.), associated with parameters of a bump or depression (e.g., pitch, pitch range, yaw, yaw range, longitudinal acceleration, latitudinal speed, longitudinal speed, latitudinal speed, etc.), and/or for transmitting sensor data to map generation system 602.

As further shown by reference number 655 in FIG. 6A, implementation 600 includes determining sensor data having a greater change in one or more parameters. For example, map generation system 602 determines sensor data having a greater change in the one or more parameters associated with a geographic location including a roadway. In such an example, map generation system 602 determines one or more subsets of sensor data associated with a geographic location (e.g., one or more chunks, etc.) with a likelihood of containing a bump or depression based on a greater change in a subset (e.g., a chunk, etc.) of the plurality of subsets of the plurality of locations by comparing the statistics for the subset to the statistics of any other subset of the plurality of subsets.

As shown by reference number 660 in FIG. 6B, map generation system 602 determines a beginning location and ending location. As an example, map generation system 602 determines a beginning location (e.g., a location associated with a leading edge of a bump or depression which a vehicle initially traverses, entry point, etc.) associated with a greatest positive change or a greatest negative change in the one or more parameters and an ending location associated with the other of the greatest positive change in the one or more subsets. For example, map generation system 102 determines at least one beginning location (e.g., entry point, starting point, etc.) of a bump or depression in the one or more subsets of the plurality of subsets associated with a greatest positive change or a greatest negative change in the one or more parameters and at least one ending location (e.g., an exit point, ending point etc.) in the one or more subsets of the plurality of subsets associated with the other of the greatest positive change or the greatest negative change in the one or more parameters. In such an example, the beginning location and ending location are determined in the direction of travel in the roadway.

As further shown by reference number 665 in FIG. 6B, implementation 600 includes determining a location of a peak value (e.g., highest point, greatest z-value, etc.). For example, map generation system 602 determines a location of a peak value by generating a plurality of lines projecting at different angles through the location of the peak value (e.g., a location associated with a greatest positive z-value for a bump, a location associated with a greatest negative z-value for a depression, etc.). In such an example, map generation system 602 determines the centerline by comparing z-values of the plurality of lines to determine a line having a minimum change in z-values as compared to any other lines projecting through the location of the peak value.

As further shown by reference number 670 in FIG. 6B, implementation 600 includes determining a beginning line and ending line. As an example, map generation system 602 determines a beginning line associated with a beginning location (e.g., an entry point of a bump, an entry point of a depression, etc.) and an ending line associated with an ending location (e.g., an exit point of a bump, an exit point of a depression, etc.). For example, map generation system 602 generates a beginning line projecting through the at least one beginning location in the one or more subsets parallel to a centerline and an ending line projecting through the at least one ending location in the one or more subsets parallel to a centerline. For example, map generation system 602 generates the beginning line and ending line based on an angle equal to the angle used to generate the centerline.

As further shown by reference number 675 in FIG. 6B, implementation 600 includes identifying a location of a bump or depression in the geographic location based on the beginning and ending lines. As an example, map generation system 602 identifies a location of a bump or depression in the geographic location based on the beginning and ending lines. As an example, map generation system 602 generates a map including an identification of a bump or depression in an area of a map (e.g., a pixel, a group of pixels, an element, a cell, etc.) corresponding to the beginning line and ending line.

In some non-limiting embodiments or aspects, map generation system 602 further identifies a bump or depression based on a right edge and a left edge that correspond to at least one of an edge of a roadway or an edge of a roadway in an intersection on a respective side of the bump or depression. For example, map generation system 602 generates an edge by projecting a beginning line and an ending outward laterally to a road edge boundary (e.g., ends at a right edge and/or left edge of a roadway, a left or right boundary of a beginning line, a left or right boundary of an ending line, etc.). In such an example, map generation system 602 generates an edge of the bump or depression in alignment (e.g., substantially aligned, etc.) with an edge of a roadway and/or a roadway in an intersection. As an example, map generation system 602 determines an edge of a bump or depression by correlating the angle of the edge of a bump or depression with an angle equal to the edge of roadway.

As shown by reference number 680 in FIG. 6C, implementation 600 includes obtaining map data associated with a bump or depression in a geographic location. As an example, autonomous vehicle 604 obtains map data associated with a bump or depression in a geographic location. For example, map generation system 602 generates a probability map (e.g., a histogram, a heatmap, etc.) associated with a bump or depression in proximity to and/or within the roadway to indicate a probability mass which is concentrated around the bump or depression (e.g., a greater number or lesser number of detections of a bump or depression in a map area as compared to any other map area of the geographic location, etc.). In some examples, a map of a bump or depression can include a map layer having a visual indication of a probability that a map area includes a bump or a depression, such as, a histogram associated with a bump or depression in proximity to and/or within a road (e.g., a histogram of the dimensions (e.g., height, length, depth, etc.) of a bump or depression, a distance of a bump or depression from a road edge boundary, a histogram of a bump or depression within and/or outside of a road edge boundary, etc.), a histogram of a bump or depression in a roadway of a road (e.g., a histogram of a bump or depression in a lane of a roadway of a road, a histogram of a bump in a travel lane of a roadway, a histogram of a bump in a parking lane of a roadway, etc.), and/or a histogram of a bump or depression beyond a road edge boundary (e.g., a drainage ditch, etc.).

In some non-limiting embodiments or aspects, map generation system 602 generates a histogram (e.g., a two dimensional histogram, a two dimensional histogram of cloud points representing a feature of a road, a normalized histogram, etc.) associated with a bump or depression including a value (e.g., a number between 0-255) of a color of each element (e.g., a pixel, a cell, etc.) in an image of the geographic location. In some non-limiting embodiments or aspects, the value of the color may vary among shades of red, green, and blue to indicate a probability of an object.

In some non-limiting embodiments or aspects, map generation system 602 may generate a map layer based on a top-down camera image (e.g., a synthesized Red Green Blue (RGB) image) of a bump or depression in the geographic location. In some non-limiting embodiments or aspects, map generation system 602 generates a bump or depression area in a top-down camera image based on identifying a bump or depression. Additionally or alternatively, a map layer may include an intensity of a color (e.g., black, white, etc.) in the image of the geographic location. In some non-limiting embodiments or aspects, map generation system 602 generates the histogram having an intensity of the color associated with a homogenous area of a geographic location having a bump or depression. For example, map generation system 602 may generate a histogram for a roadway (e.g., a travel lane, a parking lane, etc.) in the geographic location based on the intensity of the color being the same in the portion of the geographic location that includes the bump or depression.

In some non-limiting embodiments or aspects, map generation system 602 generates a region in at least one map area including a location of the at least one bump or depression for verifying or including one or more hints in a map layer for indicating that a region may be associated with a bump or depression. In such an example, one or more hints can be used to verify the map area (e.g., a bump, depression, etc.).

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   obtaining, with a computing system comprising one or more processors, sensor data captured by at least one sensor of an autonomous vehicle, the sensor data describing a plurality of return points that indicate heights of a plurality of locations on a roadway in a geographic location, each return point of the plurality of return points describing a height of a respective location of the plurality of locations;
   determining, with the computing system and using the sensor data, a change in height over the plurality of locations;
   determining, with the computing system, a beginning location in the plurality of locations, the beginning location being a location of the plurality of locations having a greatest change in height in a first direction;
   determining, with the computing system, an ending location in the plurality of locations, the ending location being a location of the plurality of locations having a greatest change in height in a second direction different than the first direction;
   determining, with the computing system, at least one of a highest location positioned at least in part on a line from the beginning location to the ending location or a lowest location positioned at least in part on a line from the beginning location to the ending location;
   selecting, with the computing system, a centerline from a plurality of lines projecting through the highest location or the lowest location, the centerline being selected from the plurality of lines to have a minimum change in height between the highest location or the lowest location and a remainder of locations from the plurality of locations that are on the centerline;
   generating, with the computing system, a beginning line projecting parallel to the centerline through the beginning location and an ending line projecting parallel to the centerline through the ending location;
   identifying, with the computing system, at least one of a bump in the roadway or a depression in the roadway based at least in part on the beginning line; and
   modifying, before the autonomous vehicle reaches the bump in the roadway or the depression in the roadway, at least one control of the autonomous vehicle based on the bump in the roadway or the depression in the roadway.

2. The computer-implemented method of claim 1, further comprising:
   generating, with the computing system, a right edge connecting the beginning line and the ending line based on at least one of a first edge of the roadway or a first edge of an intersection of the roadway; and
   generating, with the computing system, a left edge connecting the beginning line and the ending line based on at least one of a second edge of the roadway or a second edge of the intersection of the roadway.

3. The computer-implemented method of claim 1, further comprising:
   generating, with the computing system, a right edge connecting the beginning line and the ending line based on a portion of the plurality of locations that are between the beginning line and the ending line; and
   generating, with the computing system, a left edge connecting the beginning line and the ending line based on the portion of the plurality of locations between the beginning line and the ending line.

4. The computer-implemented method of claim 1, wherein the plurality of locations correspond to a plurality of map areas of a map of the geographic location.

5. The computer-implemented method of claim 4, further comprising generating a probability map associated with a probability of the bump in the roadway or the depression in the roadway being in a first map area of the plurality of map areas, the probability map being generated based at least in part on a first portion of the plurality of locations in the first map area and at least in part on a second portion of the plurality of locations that overlap at least one location of the first portion of the plurality of locations.

6. The computer-implemented method of claim 5, further comprising generating, with the computing system, the map comprising a region having a selectable factor in the map for indicating the location of the bump in the roadway or the depression in the roadway in the map of the geographic location.

7. The computer-implemented method of claim 1, a height at the beginning location being determined based at least in part on a parameter selected from a z-value, a pitch, a pitch rate, a longitudinal speed, a longitudinal acceleration, a yaw, a yaw rate, a latitudinal speed, a latitudinal acceleration, an x-value, a y-value, a roll, or a roll rate.

8. The computer-implemented method of claim 1, the second direction being opposite the first direction.

9. A computing system comprising:
   one or more processors programmed to perform operations comprising:
   obtaining sensor data captured by at least one sensor of an autonomous vehicle, the sensor data describing a plurality of return points that indicate heights of a plurality of locations on a roadway in a geographic location, each return point of the plurality of return points describing a height of a respective location of the plurality of locations;

determining, using the sensor data, a change in height over the plurality of locations;

determining a beginning location in the plurality of locations, the beginning location being a location of the plurality of locations having a greatest change in height in a first direction;

determining an ending location in the plurality of locations, the ending location being a location of the plurality of locations having a greatest change in height in a second direction different than the first direction;

determining at least one of a highest location positioned at least in part on a line from the beginning location to the ending location or a lowest location positioned at least in part on a line from the beginning location to the ending location;

selecting a centerline from a plurality of lines projecting through the highest location or the lowest location, the centerline being selected from the plurality of lines to have a minimum change in height between the highest location or the lowest location and a remainder of locations from the plurality of locations that are on the centerline;

generating a beginning line projecting parallel to the centerline through the beginning location and an ending line projecting parallel to the centerline through the ending location;

identifying at least one of a bump in the roadway or a depression in the roadway based at least in part on the beginning line; and modifying, before the autonomous vehicle reaches the bump in the roadway or the depression in the roadway, at least one control of the autonomous vehicle based on the bump or depression in the roadway.

10. The computing system of claim 9, the operations further comprising:

generating a right edge connecting the beginning line and the ending line based on at least one of a first edge of the roadway and a first edge of an intersection of the roadway; and generating a left edge connecting the beginning line and the ending line based on at least one of a second edge of the roadway and a second edge of the intersection of the roadway.

11. The computing system of claim 9, the operations further comprising:

generating a right edge connecting the beginning line and the ending line based on a portion of the plurality of locations that are between the beginning line and the ending line; and generating a left edge connecting the beginning line and the ending line based on the portion of the plurality of locations between the beginning line and the ending line.

12. The computing system of claim 9, wherein the plurality of locations correspond to a plurality of map areas of a map of the geographic location.

13. The computing system of claim 12, the operations further comprising generating a probability map associated with a probability of the bump in the roadway or the depression in the roadway in a first map area of the plurality of map areas, the probability map being generated based at least in part on a first portion of the plurality of locations in the first map area and on at least in part on a second portion of the plurality of locations that overlap at least one location of the first portion of the plurality of locations.

14. The computing system of claim 13, the operations further comprising generating the map comprising a region having a selectable factor in the map for indicating the location of the bump in the roadway or the depression in the roadway in the map of the geographic location.

15. The computing system of claim 9, a height at the beginning location being determined based at least in part on a parameter selected from a z-value, a pitch, a pitch rate, a longitudinal speed, a longitudinal acceleration, a yaw, a yaw rate, a latitudinal speed, a latitudinal acceleration, an x-value, a y-value, a roll, or a roll rate.

16. A computer program product comprising at least one non-transitory computer-readable medium including program instructions that, when executed by at least one processor, cause the at least one processor to perform operations comprising:

obtaining sensor data captured by at least one sensor of an autonomous vehicle, the sensor data describing a plurality of return points that indicate heights of a plurality of locations on a roadway in a geographic location, each return point of the plurality of return points describing a height of a respective location of the plurality of locations;

determining, using the sensor data, a change in height over the plurality of locations;

determining a beginning location in the plurality of locations, the beginning location being a location of the plurality of locations having a greatest change in height in a first direction;

determining an ending location in the plurality of locations, the ending location being a location of the plurality of locations having a greatest change in height in a second direction different than the first direction;

determining at least one of a highest location positioned at least in part on a line from the beginning location to the ending location or a lowest location positioned at least in part on a line from the beginning location to the ending location;

selecting a centerline from a plurality of lines projecting through the highest location or the lowest location, the centerline being selected from the plurality of lines to have a minimum change in height between the highest location or the lowest location and a remainder of locations from the plurality of locations that are on the centerline;

generating a beginning line projecting parallel to the centerline through the beginning location and an ending line projecting parallel to the centerline through the ending location;

identifying at least one of a bump in the roadway or a depression in the roadway based at least in part on the beginning line; and modifying, before the autonomous vehicle reaches the bump in the roadway or the depression in the roadway, at least one control of the autonomous vehicle based on the bump in the roadway or the depression in the roadway.

* * * * *